US012713351B2

(12) United States Patent
Abotabl et al.

(10) Patent No.: US 12,713,351 B2
(45) Date of Patent: Aug. 18, 2026

(54) EARLY INDICATION OF NETWORK POWER SAVING MODE

(71) Applicant: QUALCOMM Incorporated, San Diego, CA (US)

(72) Inventors: Ahmed Attia Abotabl, San Diego, CA (US); Hung Dinh Ly, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 17/653,415

(22) Filed: Mar. 3, 2022

(65) Prior Publication Data

US 2023/0284143 A1 Sep. 7, 2023

(51) Int. Cl.
*H04W 52/02* (2009.01)
*H04W 56/00* (2009.01)
*H04W 74/0833* (2024.01)

(52) U.S. Cl.
CPC ..... *H04W 52/0235* (2013.01); *H04W 56/001* (2013.01); *H04W 74/0841* (2013.01)

(58) Field of Classification Search
CPC combination set(s) only.
See application file for complete search history.

(56) References Cited

U.S. PATENT DOCUMENTS

RE49,595 E * 8/2023 Noh ...................... H04L 5/0035 370/329
2009/0247229 A1* 10/2009 Teo ...................... H04B 7/0691 455/562.1
2014/0016475 A1* 1/2014 Zhou ................... H04W 72/569 370/236
2016/0013847 A1* 1/2016 Kim ...................... H04W 16/28 375/267
2019/0207731 A1* 7/2019 Park ..................... H04B 7/0486
(Continued)

FOREIGN PATENT DOCUMENTS

EP 3651505 A1 5/2020
WO 2021180206 A1 9/2021

OTHER PUBLICATIONS

A comprehensive study on the synchronization procedure in 5G NR with 3GPP-compliant link-level simulator (Year: 2023).*
(Continued)

*Primary Examiner* — Joseph E Avellino
*Assistant Examiner* — Anindita Sen
(74) *Attorney, Agent, or Firm* — Procopio, Cory, Hargreaves & Savitch LLP/QUALCOMM Incorporated

(57) ABSTRACT

Apparatus, methods, and computer-readable media for facilitating an early indication of a power saving mode are disclosed herein. The early indication of the power saving mode may enable a receiver to adapt to the operation of a network according to the indicated power saving mode. In some examples, a transmitter may provide the early indication via an SSB. For example, the transmitter may select a synchronization signal that maps to a power saving mode. In some examples, a transmitter may provide the early indication via a message of a random access procedure. The receiver receiving the early indication may apply configurations or behavior to communicate based on the indicated power saving mode.

38 Claims, 14 Drawing Sheets

(56) References Cited

U.S. PATENT DOCUMENTS

| | | | | |
|---|---|---|---|---|
| 2020/0092917 | A1* | 3/2020 | Akkarakaran | H04W 52/028 |
| 2020/0162133 | A1* | 5/2020 | Harrison | H04W 52/248 |
| 2020/0260304 | A1* | 8/2020 | Zhou | H04W 52/0235 |
| 2020/0351801 | A1* | 11/2020 | Jeon | H04W 52/48 |
| 2021/0105721 | A1* | 4/2021 | Xu | H04W 52/0229 |
| 2021/0352692 | A1 | 11/2021 | Lei et al. | |
| 2021/0367707 | A1* | 11/2021 | Wu | H04W 48/12 |
| 2022/0272760 | A1* | 8/2022 | Murray | H04W 74/0836 |
| 2022/0286964 | A1* | 9/2022 | Peng | H04W 68/005 |
| 2023/0108646 | A1* | 4/2023 | Tseng | H04W 68/025<br>455/458 |
| 2023/0171788 | A1* | 6/2023 | Kung | H04L 5/0053<br>370/329 |
| 2023/0199668 | A1* | 6/2023 | Chen | H04W 52/146<br>455/522 |
| 2024/0049069 | A1* | 2/2024 | Zhou | H04W 74/0833 |
| 2024/0154650 | A1* | 5/2024 | Faxér | H04B 7/0456 |

OTHER PUBLICATIONS

FPGA Implementation of 5G NR Primary and Secondary Synchronization (Year: 2022).*
International Search Report and Written Opinion—PCT/US2023/012637—ISA/EPO—Sep. 1, 2023.
Partial International Search Report—PCT/US2023/012637—ISA/EPO—Jul. 7, 2023.

* cited by examiner

One Frame (TDD)
10 ms
subframe
slot
RB
OFDM symbol
subcarrier
DMRS R
CSI-RS
PDCCH CORESET
SSS
PSS
PDSCH
PBCH
REG 12 REs
1 CCE = 6 REGs
SS/PBCH Block
BWP
20 RBs
channel bandwidth RBs
PUCCH
PUSCH
SRS Comb 0
SRS Comb 1
SRS
200
230
250
280

400

402 404

| | Power Mode | Power Mode Configuration |
|---|---|---|
| | Mode 1 | 128 Active Antennas |
| 410 | Mode 2 | 64 Active Antennas |
| | Mode 3 | 32 Active Antennas |
| | Mode 4 | Transmission Power A |
| 420 | Mode 5 | Transmission Power B (B < A) |
| | Mode 6 | Transmission Power C (C < B) |
| | Mode 7 | Bandwidth A |
| 430 | Mode 8 | Bandwidth B (B < A) |
| | Mode 9 | Bandwidth C (C < B) |
| | Mode 10 | X CCs |
| 440 | Mode 11 | Y CCs (Y < X) |
| | Mode 12 | Z CCs (Z < Y) |
| | Mode 13 | 128 Active Antennas, Transmission Power A, Bandwidth A, and X CCs |
| 450 | Mode 14 | 128 Active Antennas, Transmission Power A, Bandwidth B, and Y CCs |
| | Mode 15 | 64 Active Antennas, Transmission Power A, Bandwidth A, and Y CCs |
| | Mode 16 | 64 Active Antennas, Transmission Power C, Bandwidth B, and Z CCs |

FIG. 4

Second Node 704

Generate PBCH based on active power mode

710

Active power mode

714

Power mode field

722

PBCH

720

Transition indicator

724

Switch to second power mode

740

Operate in second power mode

742

First Node 702

Determine active power mode based on PBCH

730

700

900

| Sequence Seed 902 | Reference Signal 904 | Power Mode 906 | Power Mode Configuration 908 |
|---|---|---|---|
| Seed 1 | Signal 1 | Mode 1 | 128 Active Antennas |
| Seed 2 | Signal 2 | Mode 2 | 64 Active Antennas |
| Seed 3 | Signal 3 | Mode 3 | 32 Active Antennas |

| Resource 922 | Power Mode 924 | Power Mode Configuration 926 |
|---|---|---|
| Resource 1 | Mode 1 | 128 Active Antennas |
| Resource 2 | Mode 2 | 64 Active Antennas |
| Resource 3 | Mode 3 | 32 Active Antennas |

| Power Mode Field 942 | Power Mode 944 | Power Mode Configuration 946 |
|---|---|---|
| 01 | Mode 1 | 128 Active Antennas |
| 02 | Mode 2 | 64 Active Antennas |
| 03 | Mode 3 | 32 Active Antennas |

FIG. 9C 960 962 964 966

| Value | Power Mode(s) | Power Mode Configuration |
|---|---|---|
| 0 | 0-7 | Configuration A |
| 1 | 8-15 | Configuration B |

Receive from a transmitter, an SSB indicating a power saving mode is active

1004

Communicate with the transmitter based on the power saving mode indicated by the SSB

EARLY INDICATION OF NETWORK POWER SAVING MODE

The present disclosure relates generally to communication systems, and more particularly, to wireless communication including a network power saving.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method of wireless communication at a receiver is provided. The method may include receiving, from a transmitter, a synchronization signal block (SSB) indicating a power saving mode is active. The example method may also include communicating with the transmitter based on the power saving mode indicated by the SSB.

In another aspect of the disclosure, an apparatus for wireless communication at a receiver is provided. The apparatus includes a memory and at least one processor coupled to the memory, the at least one processor configured to receive, from a transmitter, an SSB indicating a power saving mode is active. The at least one processor may also be configured to communicate with the transmitter based on the power saving mode indicated by the SSB.

In another aspect of the disclosure, an apparatus for wireless communication at a receiver is provided. The apparatus may include means for receiving, from a transmitter, an SSB indicating a power saving mode is active. The example apparatus may also include means for communicating with the transmitter based on the power saving mode indicated by the SSB.

In another aspect of the disclosure, a non-transitory computer-readable storage medium storing computer executable code for wireless communication at a receiver is provided. The code, when executed, may cause a processor to receive, from a transmitter, an SSB indicating a power saving mode is active. The example code, when executed, may also cause the processor to communicate with the transmitter based on the power saving mode indicated by the SSB.

In an aspect of the disclosure, a method of wireless communication at a transmitter is provided. The method may include activating a power saving mode. The example method may also include outputting an SSB indicating that the power saving mode is active.

In another aspect of the disclosure, an apparatus for wireless communication at a transmitter is provided. The apparatus includes a memory and at least one processor coupled to the memory, the least one processor configured to activate a power saving mode. The at least one processor may also be configured to output an SSB indicating that the power saving mode is active.

In another aspect of the disclosure, an apparatus for wireless communication at a transmitter is provided. The apparatus may include means for activating a power saving mode. The example apparatus may also include means for outputting an SSB indicating that the power saving mode is active.

In another aspect of the disclosure, a non-transitory computer-readable storage medium storing computer executable code for wireless communication at a transmitter is provided. The code, when executed, may cause a processor to activate a power saving mode. The example code, when executed, may also cause the processor to output an SSB indicating that the power saving mode is active.

In another aspect of the disclosure, a method of wireless communication at a receiver is provided. The method may include transmitting a first random access message. The example method may also include receiving, from a transmitter, a second random access message indicating a power saving mode is active. Additionally, the example method may include communicating with the transmitter based on the power saving mode indicated by the second random access message.

In another aspect of the disclosure, an apparatus for wireless communication at a receiver is provided. The apparatus includes a memory and at least one processor coupled to the memory, the at least one processor configured to transmit a first random access message. The at least one processor may also be configured to receive, from a transmitter, a second random access message indicating a power saving mode is active. The at least one processor may also be configured to communicate with the transmitter based on the power saving mode indicated by the second random access message.

In another aspect of the disclosure, an apparatus for wireless communication at a receiver is provided. The apparatus may include means for transmitting a first random access message. The example apparatus may also include means for receiving, from a transmitter, a second random access message indicating a power saving mode is active. Additionally, the example apparatus may include means for communicating with the transmitter based on the power saving mode indicated by the second random access message.

In another aspect of the disclosure, a non-transitory computer-readable storage medium storing computer executable code for wireless communication at a receiver is provided. The code, when executed, may cause a processor to transmit a first random access message. The example code, when executed, may also cause the processor to receive, from a transmitter, a second random access message indicating a power saving mode is active. Additionally, the example code, when executed, may cause the processor to communicate with the transmitter based on the power saving mode indicated by the second random access message.

In another aspect of the disclosure, a method of wireless communication at a transmitter is provided. The method may include obtaining a first random access message. The example method may also include outputting a second random access message indicating a power saving mode is active.

In another aspect of the disclosure, an apparatus for wireless communication at a transmitter is provided. The apparatus includes a memory and at least one processor coupled to the memory, the at least one processor configured to obtain a first random access message. The at least one processor may also be configured to output a second random access message indicating a power saving mode is active.

In another aspect of the disclosure, an apparatus for wireless communication at a transmitter is provided. The apparatus may include means for obtaining a first random access message. The example apparatus may also include means for outputting a second random access message indicating a power saving mode is active.

In another aspect of the disclosure, a non-transitory computer-readable storage medium storing computer executable code for wireless communication at a transmitter is provided. The code, when executed, may cause a processor to obtain a first random access message. The example code, when executed, may also cause the processor to output a second random access message indicating a power saving mode is active.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 illustrates an example table of power modes and corresponding configurations, in accordance with various aspects of the present disclosure.

FIG. 9A illustrates an example table that maps reference signals to power modes and to power mode configurations, in accordance with the teachings disclosed herein.

FIG. 9B illustrates an example table that maps resources to power modes and to power mode configurations, in accordance with the teachings disclosed herein.

FIG. 9C illustrates an example table that maps power mode field values to power modes and to power mode configurations, in accordance with the teachings disclosed herein.

FIG. 9D illustrates a table that maps values to sets of power modes and power mode configurations, in accordance with the teachings disclosed herein.

DETAILED DESCRIPTION

Figure 1:
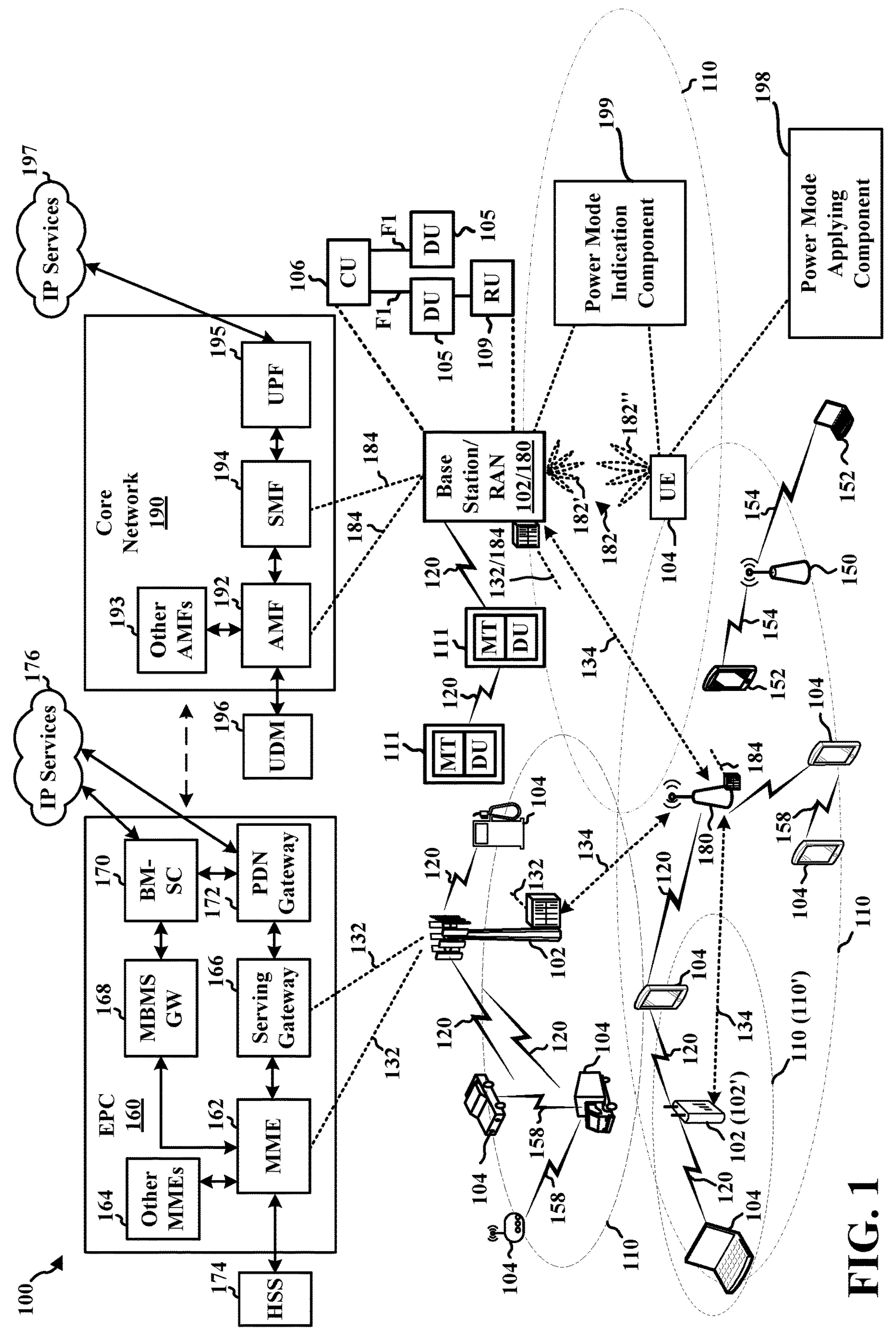
FIG. 1 is a diagram illustrating an example of a wireless communications system and an access network.

A network node (e.g., a UE or a network entity, such as a base station) may have different modes of operation associated with different configuration parameters that may provide tradeoffs between aspects of the network node, such as performance, coverage, power savings, etc. For example, a power mode, sometimes referred to as a "power saving mode" herein, is a mode of operation of a network node that enables the network node to conserve power resources while maintaining wireless communication. The network node may adjust one or more of its configuration parameters to operate in the power mode. Examples of configuration parameters related to operating in the power mode may include resources that increase or decrease the ability of the network node to receive (or obtain) a communication or to transmit (or output) a communication.

In some examples, a network node may be configured with different power modes that have tradeoffs between different aspects, such as between power saving and performance. For example, a network node may have the ability to communicate using a first quantity of antennas (e.g., transmission and/or reception antennas) and may be configured with different power modes associated with different quantities of active antennas. For example, the network node may have the ability to communicate using 128 antennas, and may be configured with a first power mode in which the 128 antennas are active antennas, with a second power mode in which 64 antennas of the 128 antennas are active antennas, and a third power mode in which 32 antennas of the 128 antennas are active antennas. The network node may reduce power consumption by operating in the third power mode compared to the first power mode or the second power mode. However, reducing the quantity of active antennas, for example, when operating in the third power mode, may also reduce performance by reducing resources available for transmitting and/or receiving communications. Thus, while operating in the first power mode may increase performance compared to the third power mode, operating in the first power mode may also reduce power savings compared to the third power mode.

Network nodes in communication may switch between different power modes. The power mode in which the network node is operating in may be referred to as the "active power mode" herein. For example, a network node may be in communication with a UE and the network node may switch from operating in the first power mode to the third power mode (e.g., the third power mode is the active power mode).

In some examples, the network node may switch between different power modes based on network input. Examples of network input include communications from a device in communication with the network node, such as a network entity in communication with a base station or a UE. For example, a communication from a network entity may include information relating to power savings that causes the network node to operate in a power mode. In some examples, the power savings information may include an indicator of a particular power mode, such as an indicator associated with the third power mode. In some examples, the power saving information may include a configuration related to a configuration parameter, such as a configuration for the network node to use 32 active antennas.

Additionally, or alternatively, the network node may switch between different power modes based on traffic conditions in an environment. For example, different power modes may be suitable for different environments. The network node may determine a current traffic condition based on measurements performed on received and/or transmitted communications. Examples of traffic conditions include high traffic and low traffic and the environment may include the network node, the UE, and any additional nodes in communication with the network node and/or the UE, such as a base station, another UE, etc. In some examples, the current traffic condition may be based on measurements performed at the network node. In other examples, the current traffic condition may be based on measurements performed by a device within the environment. In some examples, a level of the traffic condition (e.g., high traffic, low traffic, etc.) may be based on a comparison of measured traffic to one or more thresholds.

As an example, a network node may be configured with 128 antennas, but may change the quantity of active antennas based on received network input (e.g., a communication from a device in communication with the network node) and/or traffic conditions measured within the environment. In a first scenario, the network node may be serving a relatively small quantity of UEs and, thus, may operate in a power mode in which 32 of the antennas are active antennas (e.g., the first power mode). As the quantity of UEs being served by the network node increases, the network node may switch to different power modes with increasing quantity of active antennas (e.g., the second power mode with 64 active antennas or the third power mode with 128 active antennas, etc.). Thus, in scenarios in which the current traffic conditions indicate low traffic, the network node may operate in a power mode in which a subset of a maximum quantity of antennas are active antennas to conserve power.

In some examples, when a network node is in communication with a UE, the network mode may operate in a power mode (e.g., an active power mode) and transmit a configuration of the active power mode to the UE. For example, the network node may transmit dynamic signaling (e.g., control information or a control element) or a radio resource control (RRC) configuration indicating the configuration of the active power mode of the network node to the UE. The UE may then adjust its configuration and/or behavior based on the indicated active power mode. However, in such scenarios, the network node transmits and the UE receives the indication of the active power mode after the network node and the UE establish a connection (e.g., after performing an access procedure, such as an initial access procedure or a random access procedure). Thus, while the network node and the UE are attempting to establish a connection with each other, the UE may be operating in a power mode that is associated with reduced power savings compared to the power savings associated with the active power mode.

Aspects disclosed herein include techniques for a receiver (e.g., the UE) to determine an active power mode of a transmitter (e.g., the network node) prior to the receiver and the transmitter establishing a connection (e.g., before the performing of the access procedure is complete). For example, the transmitter may transmit and the receiver may receive an indication of the active power mode during the performing of the access procedure. Such an indication may sometimes be referred to as an "early indication" herein because the indication enables the receiver to determine the active power mode of the transmitter prior to establishing the connection with the transmitter. The receiver may then adapt its operation based on the indicated active power mode, which may provide increased power savings during the performing of the access procedure and/or after the performing of the access procedure is complete. The early indication may enable the UE to adapt its configuration and/or behavior to operate according to the active power mode. The receiving of the early indication of the active power mode may improve coverage, increase reliability, and/or reduce latency. For example, based on an early indication of an active power mode of the transmitter, the receiver may adapt its configuration based on the indicated active power mode. As an example, if the active power mode indicates (e.g., based on the early indication) that the transmitter is transmitting with a reduced transmission power during the access procedure, the receiver may monitor for repetitions of synchronization signal blocks (SSBs) or identify other parameters that may assist the receiver in performing the access procedure. In another example, if the active power mode indicates (e.g., based on the early indication) that the transmitter is transmitting with a reduced quantity of active antennas, the receiver may determine that the beamforming capabilities of the transmitter are reduced and, thus, the receiver may increase its transmitting power to facilitate performing the access procedure. In another example, if the active power mode indicates (e.g., based on the early indication) that the transmitter is transmitting with a reduced bandwidth, the receiver may determine that the transmitter will spread its message across symbols in a time domain, which will increase the amount of time over which the message is being transmitted. In such an example, the receiver may adjust its configuration parameters to facilitate increasing its transmitting power and/or operating at a higher modulation and coding scheme (MCS) based on knowledge of the active power mode.

In some examples, an early indication of an active power mode of a transmitter may include a synchronization signal (e.g., at least one of a primary synchronization signal (PSS) or a secondary synchronization signal (SSS)) of an SSB. For example, the transmitter may transmit a synchronization signal that is received by the transmitter and that indicates the active power mode of the transmitter. In some examples, using the synchronization signal as the early indication of the active power mode may improve coverage as the transmitting of the synchronization signal may be based as a function of the active power mode. For example, the active power mode may be associated with a reduced quantity of active antennas. In such examples, the transmitter may generate the synchronization signal (e.g., a PSS sequence or an SSS sequence) based on the reduced quantity of active antennas associated with the active power mode and, thus, may allow the synchronization signal to be received with improved reliability and/or across an increased coverage area.

According to one or more aspects, different synchronization signals may map to different power modes. The transmitter may generate a synchronization signal based on the active power mode of the transmitter and transmit an SSB including the generated synchronization signal (e.g., the early indication of the active power mode). The receiver may monitor for SSBs and determine the active power mode of the transmitter based on the synchronization signal detected in a received signal. The receiver may detect the synchronization signal by measuring a correlation between the received signal and different reference signals that map to different power modes. The different reference signals may include one or more references that the receiver may use to determine when the received signal includes a monitored for signal. In some examples, the receiver may be configured with the different reference signals. In some examples, the receiver may generate the different reference signals using, for example, a seed (e.g., an input value of a mathematical expression). The receiver may determine that the received signal includes the synchronization signal when the measured correlation between the received signal and one of the reference signals satisfies a threshold. In such examples, the receiver may determine the active power mode of the transmitter by mapping the reference signal to one of the power modes.

In another example, different time-frequency resources allocated to the synchronization signal in a time domain and/or a frequency domain may map to different power modes. In such examples, the transmitter may select time-frequency resources based on the active power mode of the transmitter and transmit the synchronization signal using the selected time-frequency resources. The receiver may determine the active power mode of the transmitter based on the time-frequency resources at which the receiver detects the synchronization signal.

In some examples, the early indication of the active power mode of the transmitter may be provided via a physical broadcast channel (PBCH) of an SSB. For example, the transmitter may indicate the active power mode via one or more bits of a power mode field of the PBCH. In some examples, using the PBCH as the early indication of the active power mode may improve latency as the receiver may determine the active power mode by reading the value of the power mode field after the SSB is received. For example, the synchronization signal of the SSB may remain unchanged regardless of the active power mode of the transmitter. Thus, the receiver may measure the correlation between a received signal and a reference signal instead of between the received signal and different reference signals. When the receiver determines that the received signal includes the reference signal (e.g., based on the measured correlation), the receiver may determine that the received signal corresponds to an SSB and decode the PBCH of the SSB to read the value of the power mode field. Thus, there may be a reduced delay between when the receiver receives a received signal and determines the active power mode of the transmitter when the PBCH corresponds to the early indication compared to when the synchronization signal corresponds to the early indication.

In some examples, the early indication of the active power mode of the transmitter may include a message of an access procedure (e.g. a message of an initial access procedure or a message of a random access procedure). For example, the transmitter may transmit a response access message indicating the active power mode based on an initial access message received from a receiver attempting to establish a connection with the transmitter. For example, the response access message may include a power mode field that the transmitter may populate based on the active power mode of the transmitter. In some examples, the power mode field may provide an explicit indication of the active power mode. In some examples, the power mode field may indicate a set of power modes associated with a same configuration, and the set of power modes may include the active power mode. In some examples, the transmitter may also provide a configuration of the active power mode during the performing of the access procedure. In some examples, using a message (or messages) of the access procedure as the early indication of the active power mode may improve reliability and/or reduce latency as more resources are available to include information with messages of the access procedures than with SSBs. For example, while SSBs are broadcast communications, messages of the access procedure are directed to specific UEs and, thus, may include resources for providing UE-specific information.

Although the following description may be focused on indicating the active power mode of the transmitter prior to a connection is established between the transmitter and the receiver (e.g., before the performing of an access procedure is completed), the concepts described herein may also assist the receiver when performing a handover procedure.

Additionally, while the following description may be focused on a receiver that receives an early indication of an active power mode of a transmitter and that communicates with the transmitter based on the active power mode, the concepts described herein may apply to access networks employing access link communication and/or sidelink communication. For example, the receiver may include a UE, the transmitter may include a base station, and the UE and the base station may communicate via access links. In other examples, the receiver may include a first UE, the transmitter may include a second UE, and the first UE and the second UE may communicate via sidelink.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and use cases are described in this application by illustration to some examples, additional or different aspects, implementations, and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc., may range a spectrum from chip-level or modular components to non-modular, non-chip-level implementations and further to aggregate, distributed, or original equipment manufacturer (OEM) devices or systems incorporating one or more techniques described herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). The techniques described herein may be practiced in a wide variety of devices, chip-level components, systems, distributed arrangements, aggregated or disaggregated components, end-user devices, etc. of varying sizes, shapes, and constitution.

As described herein, a node, which may be referred to as a node, a network node, or a wireless node, may be a base station, a UE, a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first network node, the second network node, and the third network node may be different relative to these examples. Similarly, reference to a UE, a base station, an apparatus, a device, a computing system, or the like may include disclosure of the UE, the base station, the apparatus, the device, the computing system, or the like being a network node. For example, disclosure that a UE is configured to receive information from a base station also discloses that a first network node is configured to receive information from a second network node. In this example, consistent with this disclosure, the first network node may refer to a first UE, a first base station, a first apparatus, a first device, a first computing system, a first one or more components, a first processing entity, or the like configured to receive the information, and the second network node may refer to a second UE, a second base station, a second apparatus, a second device, a second computing system, a second one or more components, a second processing entity, or the like.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

In some aspects, a base station 102 or 180 may be referred to as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network 190 may be referred to as the backhaul.

The RAN may be based on a functional split between various components of the RAN, e.g., between the CU 106, the DU 105, or the RU 109. The CU 106 may be configured to perform one or more aspects of a wireless communication protocol, e.g., handling one or more layers of a protocol stack, and the one or more DUs 105 may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer, and/or an upper layer. In other implementations, the split between the layer functions provided by the CU, the DU, or the RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to the core network 190 or the EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

As described above, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 14:
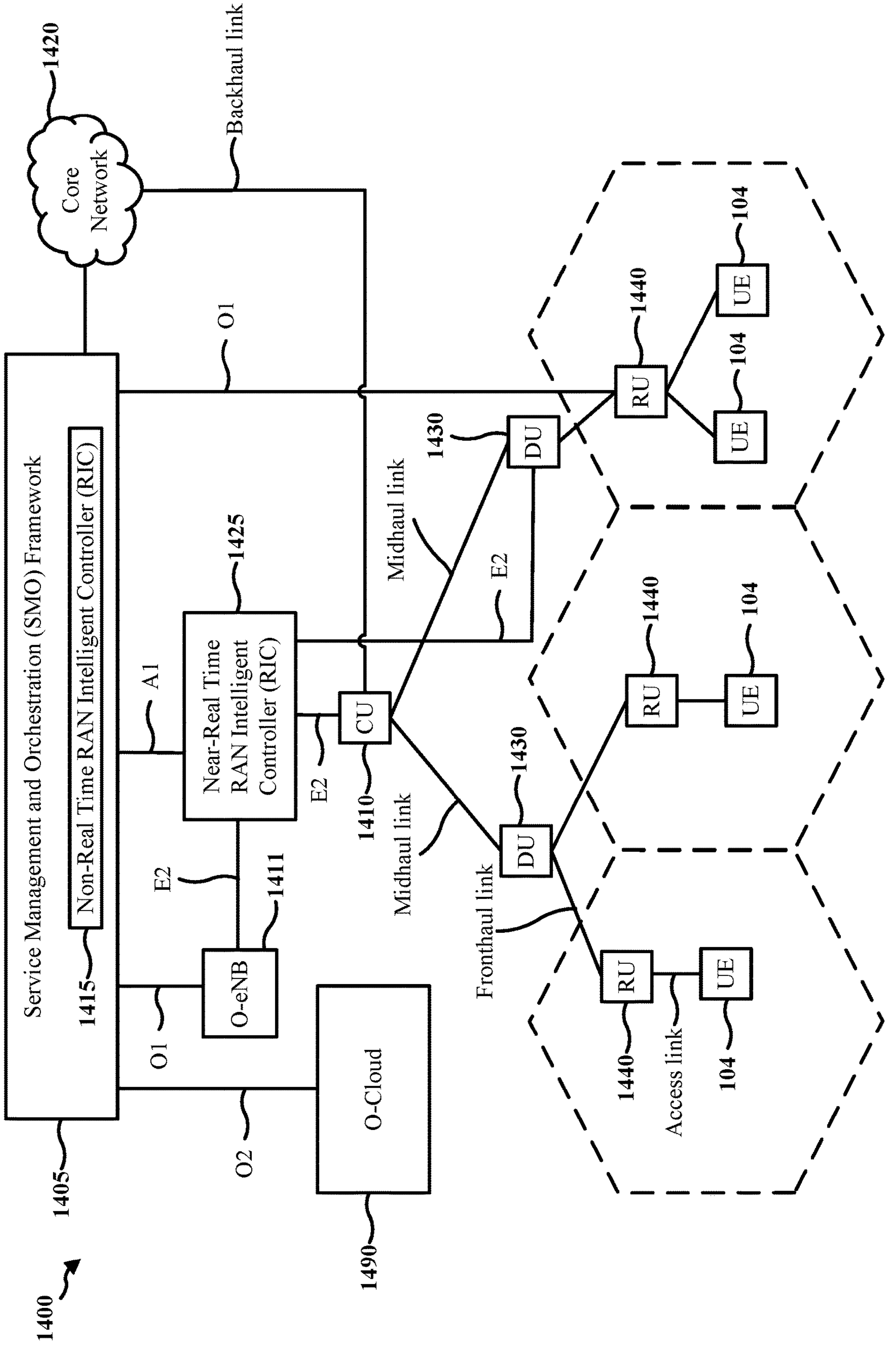
FIG. 14 is a diagram illustrating an example disaggregated base station architecture, in accordance with the teachings disclosed herein.

As an example, FIG. 14 shows a diagram illustrating an example disaggregated base station 1400 architecture. The disaggregated base station 1400 architecture may include one or more CUs 1410 (e.g., the CU 106 of FIG. 1) that can communicate directly with a core network 1420 via a backhaul link, or indirectly with the core network 1420 through one or more disaggregated base station units (such as a Near-Real Time (Near-RT) RAN Intelligent Controller (RIC) 1425 via an E2 link, or a Non-Real Time (Non-RT) RIC 1415 associated with a Service Management and Orchestration (SMO) Framework 1405, or both). A CU 1410 may communicate with one or more DUs 1430 (e.g. the DUs 105 of FIG. 1) via respective midhaul links, such as an F1 interface. The DUs 1430 may communicate with one or more RUs 1440 (e.g., the RU 109 of FIG. 1) via respective fronthaul links. The RUs 1440 may communicate with respective UEs 104 (of FIG. 1) via one or more radio frequency (RF) access links. In some implementations, the UE 104 may be simultaneously served by multiple RUs 1440.

Each of the units, i.e., the CUs 1410, the DUs 1430, the RUs 1440, as well as the Near-RT RICs 1425, the Non-RT RICs 1415 and the SMO Framework 1405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1410. The CU 1410 may be configured to handle user plane functionality (i.e., Central Unit-User Plane (CU-UP)), control plane functionality (i.e., Central Unit-Control Plane (CU-CP)), or a combination thereof. In some implementations, the CU 1410 can be logically split into one or more CU-UP units and one or more CU-CP units. The CU-UP unit can communicate bidirectionally with the CU-CP unit via an interface, such as the E1 interface when implemented in an O-RAN configuration. The CU 1410 can be implemented to communicate with the DU 1430, as necessary, for network control and signaling.

The DU 1430 may correspond to a logical unit that includes one or more base station functions to control the operation of one or more RUs 1440. In some aspects, the DU 1430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1430 may further host one or more low PHY layers. Each layer (or module) can be implemented with an interface configured to communicate signals with other layers (and modules) hosted by the DU 1430, or with the control functions hosted by the CU 1410.

Lower-layer functionality can be implemented by one or more RUs 1440. In some deployments, an RU 1440, controlled by a DU 1430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1440 can be implemented to handle over the air (OTA) communication with one or more UEs 104. In some implementations, real-time and non-real-time aspects of control and user plane communication with the RU(s) 1440 can be controlled by the corresponding DU 1430. In some scenarios, this configuration can enable the DU(s) 1430 and the CU 1410 to be implemented in a cloud-based RAN architecture, such as a vRAN architecture.

The SMO Framework 1405 may be configured to support RAN deployment and provisioning of non-virtualized and virtualized network elements. For non-virtualized network elements, the SMO Framework 1405 may be configured to support the deployment of dedicated physical resources for RAN coverage requirements which may be managed via an operations and maintenance interface (such as an O1 interface). For virtualized network elements, the SMO Framework 1405 may be configured to interact with a cloud computing platform (such as an open cloud 1490 (O-Cloud)) to perform network element life cycle management (such as to instantiate virtualized network elements) via a cloud computing platform interface (such as an O2 interface). Such virtualized network elements can include, but are not limited to, CUs 1410, DUs 1430, RUs 1440 and Near-RT RICs 1425. In some implementations, the SMO Framework 1405 can communicate with a hardware aspect of a 4G RAN, such as an open eNB (O-eNB) 1411, via an O1 interface. Additionally, in some implementations, the SMO Framework 1405 can communicate directly with one or more RUs 1440 via an O1 interface. The SMO Framework 1405 also may include a Non-RT RIC 1415 configured to support functionality of the SMO Framework 1405.

The Non-RT RIC 1415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1425. The Non-RT RIC 1415 may be coupled to or communicate with (such as via an A1 interface) the Near-RT RIC 1425. The Near-RT RIC 1425 may be configured to include a logical function that enables near-real-time control and optimization of RAN elements and resources via data collection and actions over an interface (such as via an E2 interface) connecting one or more CUs 1410, one or more DUs 1430, or both, as well as an O-eNB, with the Near-RT RIC 1425.

In some implementations, to generate AI/ML models to be deployed in the Near-RT RIC 1425, the Non-RT RIC 1415 may receive parameters or external enrichment information from external servers. Such information may be utilized by the Near-RT RIC 1425 and may be received at the SMO Framework 1405 or the Non-RT RIC 1415 from nonnetwork data sources or from network functions. In some examples, the Non-RT RIC 1415 or the Near-RT RIC 1425 may be configured to tune RAN behavior or performance. For example, the Non-RT RIC 1415 may monitor long-term trends and patterns for performance and employ AI/ML models to perform corrective actions through the SMO Framework 1405 (such as reconfiguration via O1) or via creation of RAN management policies (such as A1 policies).

Referring again to FIG. 1, the base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, a receiver, such as the UE 104, may be configured to manage one or more aspects of wireless communication. For example, the UE 104 may include a power mode applying component 198 configured to facilitate communication via a power mode. In some aspects, the power mode applying component 198 may be configured to receive, from a transmitter, an SSB indicating a power saving mode is active. The example power mode applying component 198 may also be configured to communicate with the transmitter based on the power saving mode indicated by the SSB.

In some aspects, the power mode applying component 198 may be configured to transmit a first random access message. The example power mode applying component 198 may also be configured to receive, from a transmitter, a second random access message indicating a power saving mode is active. Additionally, the example power mode applying component 198 may be configured to communicate with the transmitter based on the power saving mode indicated by the second random access message.

In another configuration, a transmitter, such as the base stations 102 and 180 or the UE 104, may be configured to manage one or more aspects of wireless communication. For example, the base stations 102/180 or the UE 104 may include a power mode indication component 199 configured to provide an early indication of a power mode of operation. In some aspects, the power mode indication component 199 may be configured to activate a power saving mode. The example power mode indication component 199 may also be configured to output an SSB indicating that the power saving mode is active.

In some aspects, the power mode indication component 199 may be configured to obtain a first random access message. The example power mode indication component 199 may also be configured to output a second random access message indicating a power saving mode is active.

The aspects presented herein may enable a receiver (e.g., a UE 104) to receive an early indication of a power mode of operation associated with a transmitter (e.g., a UE 104 or a base station 102/180), which may facilitate increasing reliability and/or reducing latency, for example, by enabling the receiver to adapt its parameters for communication with the transmitter based on the operation of the receiver according to the indicated power mode.

Although the following description provides examples directed to 5G NR, the concepts described herein may be applicable to other similar areas, such as LTE, LTE-A, CDMA, GSM, and/or other wireless technologies.

Figure 2B:
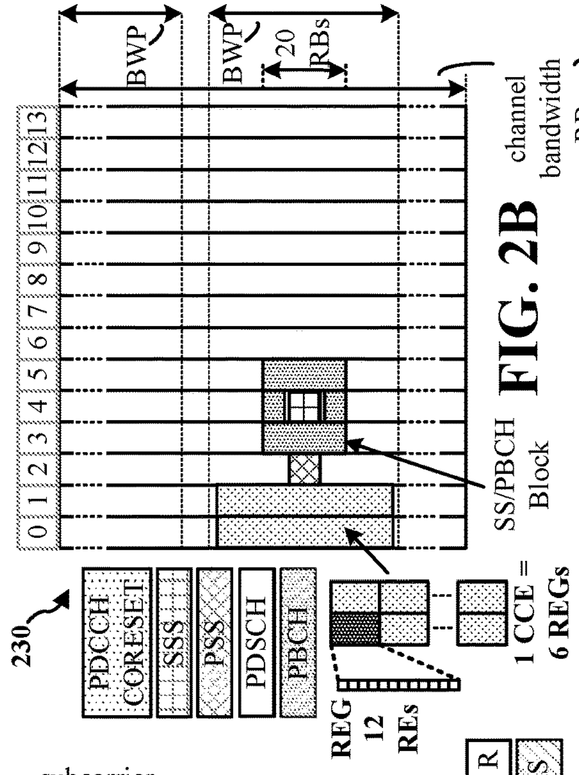
FIG. 2B is a diagram illustrating an example of DL channels within a subframe, in accordance with various aspects of the present disclosure.
Figure 2D:
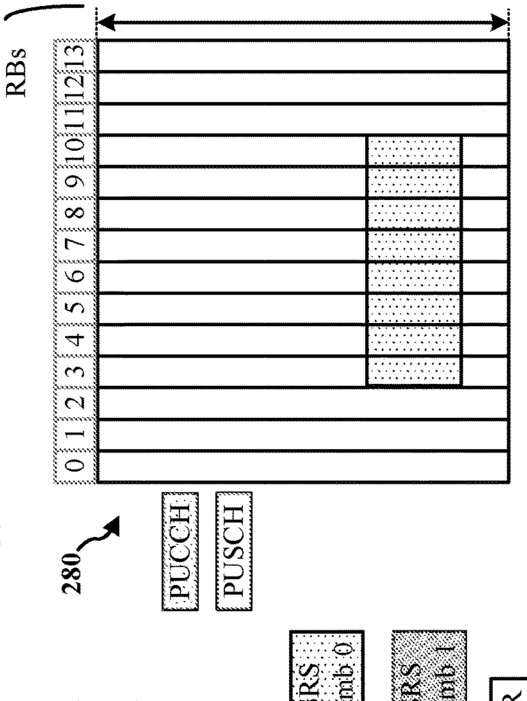
FIG. 2D is a diagram illustrating an example of UL channels within a subframe, in accordance with various aspects of the present disclosure.
Figure 2A:
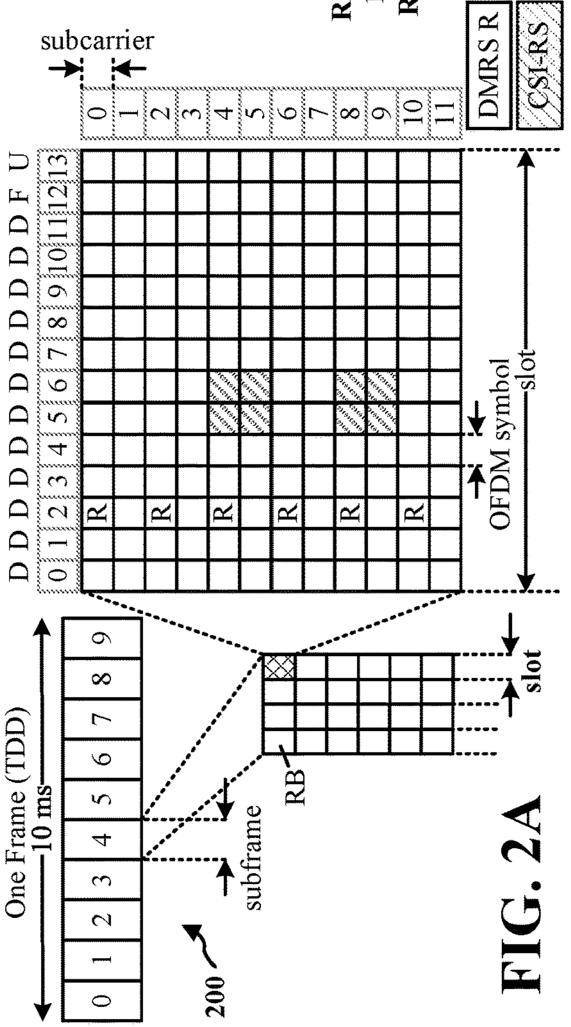
FIG. 2A is a diagram illustrating an example of a first frame, in accordance with various aspects of the present disclosure.
Figure 2C:
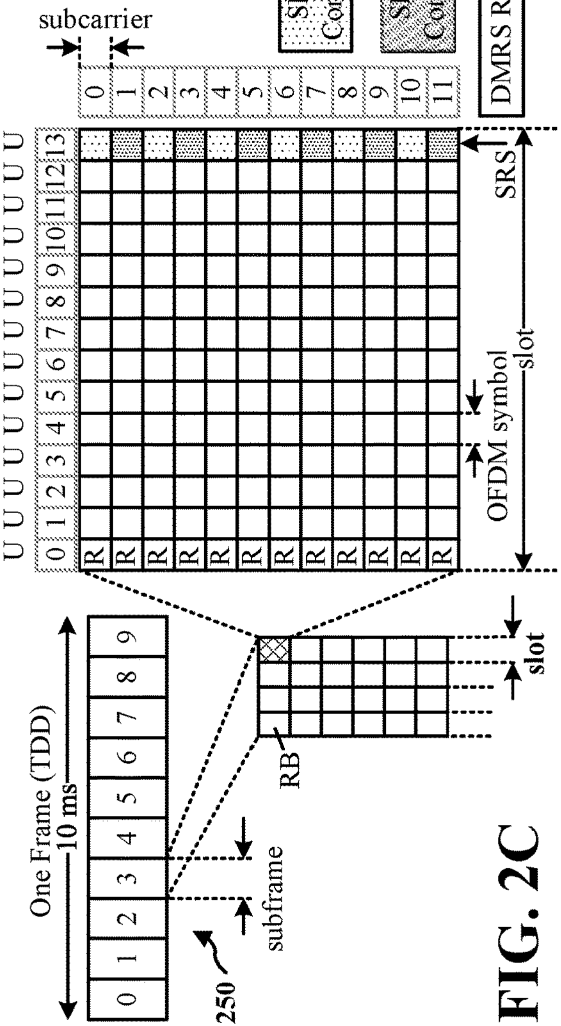
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
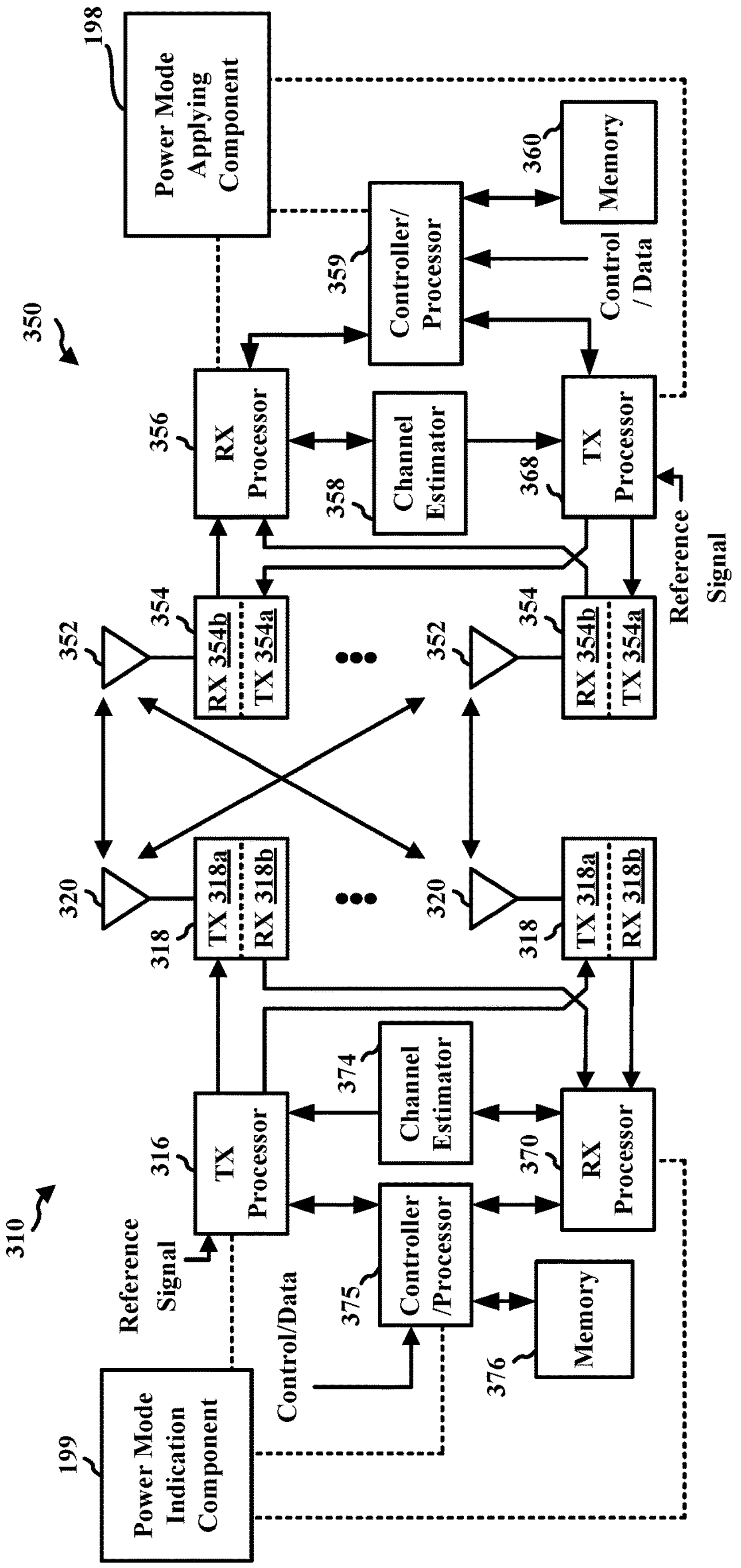
FIG. 3 is a diagram illustrating an example of a base station and a user equipment (UE) in an access network.

FIG. 3 is a block diagram that illustrates an example of a first wireless device 310 that is configured to exchange wireless communication with a second wireless device 350. In the illustrated example, the first wireless device 310 may include a network node, such as a base station, the second wireless device 350 may include a UE, and the base station may be in communication with the UE in an access network. In other examples, the first wireless device 310 may include a first UE, the second wireless device 350 may include a second UE, and the first UE may be in communication with the second UE via sidelink. As shown in FIG. 3, the first wireless device 310 includes a transmit processor (TX processor 316), a transceiver 318 including a transmitter 318*a* and a receiver 318*b*, antennas 320, a receive processor (RX processor 370), a channel estimator 374, a controller/processor 375, and memory 376. The example second wireless device 350 includes antennas 352, a transceiver 354 including a transmitter 354*a* and a receiver 354*b*, an RX processor 356, a channel estimator 358, a controller/processor 359, memory 360, and a TX processor 368. In other examples, the first wireless device 310 and/or the second wireless device 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless device 350. Each spatial stream may then be provided to a different antenna 320 via a separate transmitter 318*a*. Each transmitter 318*a* may modulate a radio frequency (RF) carrier with a respective spatial stream for transmission.

At the second wireless device 350, each receiver 354*b* receives a signal through its respective antenna 352. Each receiver 354*b* recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless device 350. If multiple spatial streams are destined for the second wireless device 350, they may be combined by the RX processor 356 into a single OFDM symbol stream. The RX processor 356 then converts the OFDM symbol stream from the time domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless device 310. These soft decisions may be based on channel estimates computed by the channel estimator 358. The soft decisions are then decoded and deinterleaved to recover the data and control signals that were originally transmitted by the first wireless device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the first wireless device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless device 310 may be used by the TX processor 368 to select the appropriate coding and modulation schemes, and to facilitate spatial processing. The spatial streams generated by the TX processor 368 may be provided to different antenna 352 via separate transmitters 354*a*. Each transmitter 354*a* may modulate an RF carrier with a respective spatial stream for transmission.

The UL transmission is processed at the first wireless device 310 in a manner similar to that described in connection with the receiver function at the second wireless device 350. Each receiver 318*b* receives a signal through its respective antenna 320. Each receiver 318*b* recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the second wireless device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the power indication applying component 198 of FIG. 1.

At least one of the TX processor 316, the RX processor 370, and the controller/processor 375 may be configured to perform aspects in connection with the power mode indication component 199 of FIG. 1.

A network node (e.g., a UE or a network entity, such as a base station) may have different modes of operation associated with different configuration parameters that may provide tradeoffs between aspects of the network node, such as performance, coverage, power savings, etc. For example, a power mode, sometimes referred to as a "power saving mode" herein, is a mode of operation of a network node that enables the network node to conserve power resources while maintaining wireless communication. The network node may adjust one or more of its configuration parameters to operate in the power mode. Examples of configuration parameters related to operating in the power mode may include resources that increase or decrease the ability of the network node to receive (or obtain) a communication or to transmit (or output) a communication. For example, configuration parameters may include a number of active antennas, a bandwidth, a transmission power, a number of active CCs, a number of layers, a number of inactive symbols in a slot, as well as other parameters.

In some examples, a network node may be configured with different power modes that have tradeoffs between different aspects, such as between power saving and performance. FIG. 4 illustrates an example table 400 of power mode configurations 404 corresponding to different power modes 402, as presented herein. As shown in FIG. 4, the different power modes may be associated with different power mode configurations. As an example, in a first power mode, a network node may transmit and/or receive communication using 128 antennas. In a second power mode, the network node may transmit and/or receive communication using a reduced set of antennas, such as 64 antennas. In a third power mode, the network node may transmit and/or receive communication using a further reduced set of antennas, such as 32 antennas. As shown in FIG. 4, a first power modes subset 410 illustrate examples of multiple power mode configurations based on a number of active antennas. The power mode configurations 404 may also include other parameters that are the same or different between respective power modes of the first power modes subset 410, for example, beyond the number of active antennas. For example, while the power modes of the first power modes subset 410 are associated with different numbers of active antennas, two or more of the respective power modes may be associated with a same or different bandwidth, a same or different transmission power, a same or different number of active CCs, a same or different number of layers, a same or different number of inactive symbols in a slot, etc.

As another example of power mode configurations, the network node may reduce transmission power in one or more power modes in order to conserve power. For example, in a fourth power mode of the table 400, the network node may use a first transmission power for transmitting communications. In a fifth power mode of the table 400, the network node may transmit communications using a reduced transmission power. Similar to the example for power mode configurations with reduced sets of active antennas, the network node may be configured with additional power modes with further reduced transmission power. As shown in FIG. 4, a second power modes subset 420 illustrates examples of multiple power mode configurations based on transmission power. Similar to the example of the power mode configurations 404 of the first power modes subset 410, the power mode configurations associated with the power modes of the second power modes subset 420 may also include other parameters that are the same or different between respective power modes of the second power modes subset 420, for example, beyond the transmission power.

As another example of power mode configurations, the network node may operate based on a reduced bandwidth in one or more power modes in order to conserve power. For example, in a seventh power mode of the table 400, the network node may use a first bandwidth for communication with one or more other network nodes. In an eight power mode of the table 400, the network node may use a reduced bandwidth for communication with the one or more other network nodes. Similar to the example for power mode configurations with a reduced set of active antennas, the network node may be configured with additional power modes with further reduced bandwidth. As shown in FIG. 4, a third power modes subset 430 illustrates examples of multiple power mode configurations based on bandwidth Similar to the example of the power mode configurations 404 of the first power modes subset 410, the power mode configurations associated with the power modes of the third power modes subset 430 may also include other parameters that are the same or different between respective power modes of the third power modes subset 430, for example, beyond the network bandwidth.

As another example of power mode configurations, the network node may operate based on a reduced number of component carriers in one or more power modes in order to conserve power. For example, in a tenth power mode of the table 400, the network node may provide, or use, a number of component carriers (CCs) for communication with one or more other network nodes. In an eleventh power mode of the table 400, the network node may provide, or use, a reduced number of CCs for communication with the one or more other network nodes. Similar to the example for power mode configurations with a reduced set of antennas, the network node may be configured with additional power modes with further reduced numbers of CCs. As shown in FIG. 4, a fourth power modes subset 440 illustrates examples of multiple power mode configurations based on a number of CCs. Similar to the example of the power mode configurations 404 of the first power modes subset 410, the power mode configurations associated with the power modes of the fourth power modes subset 440 may also include other parameters that are the same or different between respective power modes of the fourth power modes subset 440, for example, beyond the number of CCs.

In the illustrated example of FIG. 4, the table 400 includes a fifth power modes subset 450 that illustrates examples in which the power mode configurations may include a combination of parameters to illustrate the concept of different power mode configurations associated with different power modes. A power mode configuration may include any combination of parameters that affect power consumption at the network node, and is not limited to the examples of the table 400 of FIG. 4.

The examples illustrated in the table 400 of FIG. 4 are merely to illustrate the concept of power mode configurations associated with different power modes. The concepts presented herein apply to additional examples of power mode configurations.

Network nodes in communication may switch between different power modes. For example, a network node may be in communication with a UE and the network node may switch from operating in the first power mode to the third power mode. In such examples, the third power mode may be referred to as the active power mode of the network node.

In some examples, the network node may switch between different power modes based on network input. Examples of network input include communications from a device in communication with the network node, such as a network entity in communication with a base station or a UE. For example, a communication from a network entity may include information relating to power savings that causes the network node to operate in a power mode. In some examples, the power savings information may include an indicator of a particular power mode, such as an indicator associated with the third power mode. In some examples, the power saving information may include a configuration related to a configuration parameter, such as a configuration for the network node to use 32 active antennas.

Additionally, or alternatively, the network node may switch between different power modes based on traffic conditions in an environment. For example, different power modes may be suitable for different environments. The network node may determine a current traffic condition based on measurements performed on received and/or transmitted communications. Examples of traffic conditions include high traffic and low traffic and the environment may include the network node, the UE, and any additional nodes in communication with the network node and/or the UE, such as a base station, another UE, etc. In some examples, the current traffic condition may be based on measurements performed at the network node. In other examples, the current traffic condition may be based on measurements performed by a device within the environment. In some examples, a level of the traffic condition (e.g., high traffic, low traffic, etc.) may be based on a comparison of measured traffic to one or more thresholds.

As an example, a network node may be configured with 128 antennas, but may change the quantity of active antennas based on received network input (e.g., a communication from a device in communication with the network node) and/or traffic conditions measured within the environment. In a first scenario, the network node may be serving a relatively small quantity of UEs and, thus, may operate in a power mode in which 32 of the antennas are active antennas (e.g., the third power mode of the table 400). As the quantity of UEs being served by the network node increases, the network node may switch to different active power modes when the network node is configured with different power modes. For example, the network node may switch to a different active power mode associated with an increasing quantity of active antennas (e.g., the second power mode with 64 active antennas, the first power mode with 128 active antennas, etc.). Thus, in scenarios in which the current traffic conditions indicate low traffic, the network node may operate in a power mode in which a subset of a maximum quantity of antennas are active antennas to conserve power.

Figure 5:
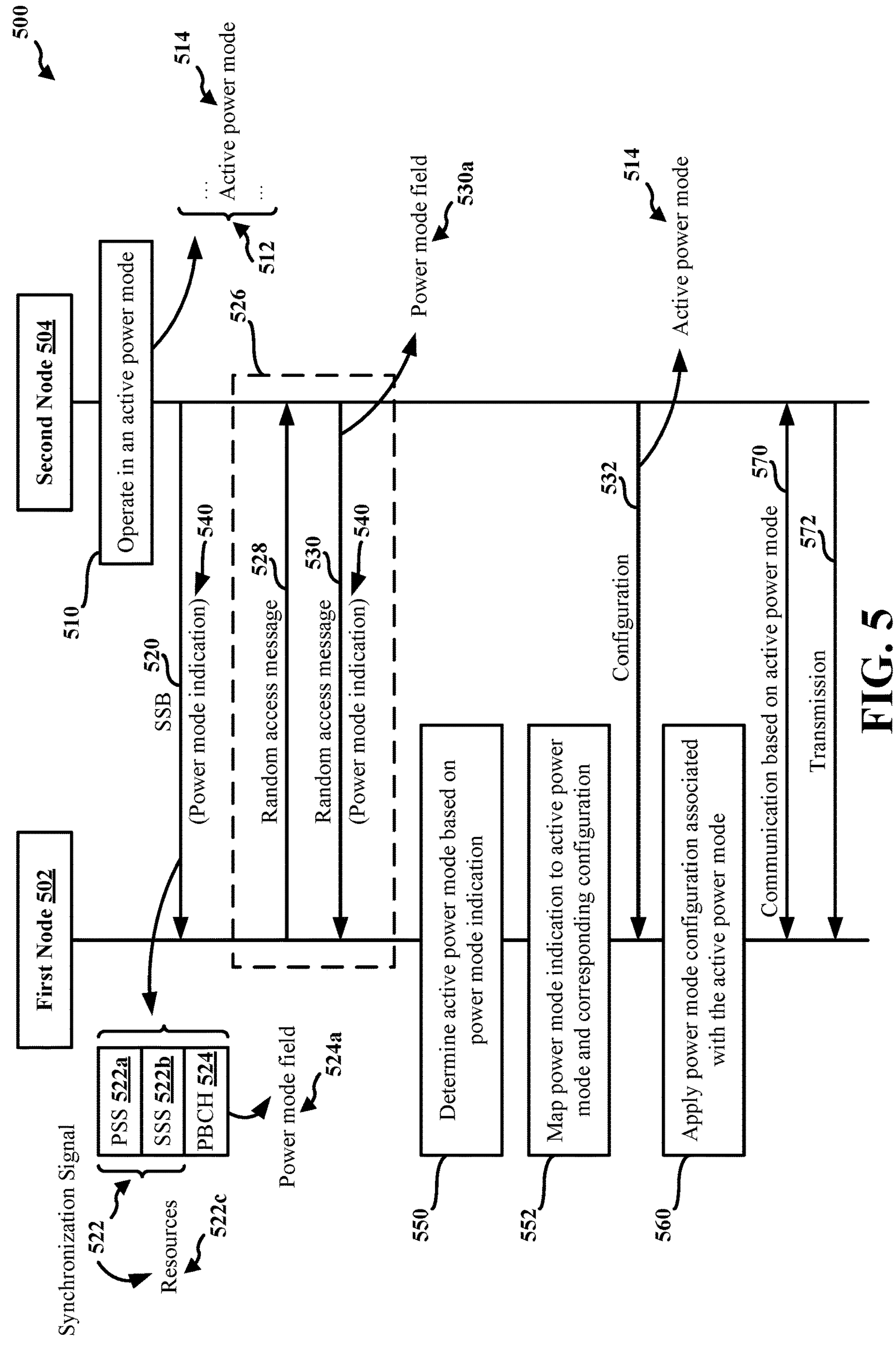
FIG. 5 is an example communication flow between a first node and a second node, in accordance with the teachings disclosed herein.

FIG. 5 is an example communication flow 500 between a first node 502 and a second node 504, as presented herein. In some examples, the first node 502 may include a UE and the second node 504 may include a base station. In some examples, the first node 502 may include a first UE and the second node 504 may include a second UE. Aspects of the first node 502 may be implemented by the UE 104 of FIG. 1 and/or the second wireless device 350 of FIG. 3. Aspects of the second node 504 may be implemented by the base station 102/180 of FIG. 1, the UE 104 of FIG. 1, and/or the first wireless device 310 of FIG. 3. Although not shown in the illustrated example of FIG. 5, in additional or alternate examples, the first node 502 and/or the second node 504 may be in communication with one or more other nodes, such as other base stations or other UEs.

In the illustrated example, the communication flow 500 facilitates the first node 502 receiving an early indication of an active power mode of the second node 504 the first node 502 adapting its configuration according to the indicated active power mode. For example, the first node 502 may receive a power mode indication 540 while performing an access procedure to establish an RRC connection with the second node 504. The access procedure may include an initial access procedure or a random access procedure. That is, the first node 502 receives the power mode indication 540 before establishing an RRC connection with the second node 504. Thus, because the first node 502 receives the power mode indication 540 and the second node 504 transmits the power mode indication 540, the first node 502 may sometimes be referred to herein as a "receiver" and the second node 504 may sometimes be referred to herein as a "transmitter."

At 510, the second node 504 operates in an active power mode 514 and applies a power mode configuration corresponding to the active power mode 514. As shown in FIG. 5, the second node 504 may be configured with a set of power modes 512 including one or more different power modes. The second node 504 may select one of the power modes (e.g., the active power mode 514) of the set of power modes 512 based on, for example, a configuration that provides power savings to the second node 504. The active power mode 514 may include any of the aspects described, for example, in connection with the table 400 of FIG. 4. For example, the power mode configuration may have a particular quantity of active antennas, transmission power, bandwidth, number of CC, etc. The first node 502 and the second node 504 may perform a random access procedure 526. The random access procedure 526 may enable the first node 502 to establish an RRC connection with the second node 504. When the first node 502 and the second node 504 are operating in an RRC connected state (e.g., after performing the random access procedure 526), the second node 504 may transmit a configuration 532 indicating the active power mode 514 of the second node 504.

As illustrated at 560, the first node 502 may apply a corresponding power mode configuration or behavior based on the active power mode 514 of the second node 504. For example, based on the active power mode 514 of the second node 504, the first node 502 may determine that the second node 504 is using a reduced quantity of active antennas to transmit communications. In such an example, the first node 502 may adjust its configuration to accommodate for the reduced beamforming abilities of the second node 504 based on the reduced quantity of active antennas. In other examples, the first node 502 may determine, based on the active power mode 514 of the second node 504, that the second node 504 is using a reduced bandwidth to receive communications. In such an example, the first node 502 may increase its transmission power when transmitting to the second node 504 to improve reception of transmissions at the second node 504.

The first node 502 and the second node 504 may transmit and receive communication 570 based on their respective power mode configurations. As an example, based on the active power mode 514 of the second node 504, the second node 504 may transmit a transmission 572 using a number of active antennas (e.g., as described in connection with the power modes of the first power modes subset 410 of the table 400 of FIG. 4), a transmission power (e.g., as described in connection with the power modes of the second power modes subset 420 of the table 400), a frequency resource based on the bandwidth (e.g., as described in connection with the power modes of the third power modes subset 430 of the table 400), in a CC that is active (e.g., as described in connection with the fourth power modes subset 440 of the table 400), or based on a combination of configuration parameters (e.g., as described in connection with the fifth power modes subset 450 of the table 400). The first node 502 may monitor for the transmission 572 based on its applied corresponding power mode configuration (e.g., as described in connection with 560). In some aspects, the first node 502 may adjust transmission to the second node 504 based on the active power mode 514, for example, based on the number of active antennas that the second node 504 will use for reception, within the bandwidth used by the second node 504, or in a CC that is active.

A network node trying to access a communication network may follow a cell search procedure that may include a series of synchronization stages. In some examples, the synchronization stages may enable the network node to determine time domain resources and/or frequency domains resources that may be useful for demodulating signals, transmitting with the correct timing, and/or acquiring system information. Synchronization signal blocks (SSBs) may include a primary synchronization signal (PSS), a secondary synchronization signal (SSS), and a physical broadcast channel (PBCH). The network node may use the PSS to determine symbol timing and a physical layer identity. The network node may use the SSS to determine a physical layer cell identity group number (e.g., a "cell identifier") and radio frame timing. The PBCH may carry a master information block (MIB), which may provide a number of resource blocks in the system bandwidth and a system frame number.

The second node 504 may transmit an SSB burst including multiple SSBs. The SSBs may be transmitted at predetermined locations (e.g., time locations) within an SSB period, and the maximum number of SSBs may depend on the frequency band. In some examples, each of the SSBs may be transmitted on a different respective beam, and the first node 502 may search for all of the SSBs until the first node 502 identifies a suitable SSB (e.g., an SSB associated with a satisfactory measurement). In some such examples, once the first node 502 identifies a suitable SSB, the first node 502 may read the SSB to identify information regarding demodulating signals, transmitting with the correct timing, and/or acquiring system information.

As shown in FIG. 5, the second node 504 transmits an SSB 520 that is received by the first node 502. The SSB 520 includes a synchronization signal 522 including a PSS **522*a* and an SSS 522*b*, and a PBCH 524. The first node 502 may obtain symbol timing from the PSS 522*a*. The first node 502 may then obtain the cell identifier from the SSS 522*b*. The first node 502 may then read the MIB that is encoded in the PBCH 524, which may include information used to read SIBs. The first node 502 may then acquire the SIB 1**.

The first node 502 may use information from the SSB 520 to perform the random access procedure 526 with the second node 504. The random access procedure 526 may enable the first node 502 to establish an RRC connection with the second node 504. When the first node 502 and the second node 504 are operating in an RRC connected state (e.g., after performing the random access procedure 526), the second node 504 may transmit a configuration 532 indicating the active power mode 514 of the second node 504. The configuration 532 may additionally, or alternatively, include information about the different possible power modes of the second node 504. The second node 504 may transmit the configuration 532 that is received by the first node 502 in RRC signaling or via dynamic signaling (e.g., control information or a control element, such as a MAC control element (MAC-CE)). The first node 502 may then adjust, at 560, its power mode configuration and/or behavior based on the active power mode 514.

However, in such scenarios, the second node 504 transmits and the first node 502 receives the configuration 532 of the active power mode 514 after the first node 502 and the second node 504 establish a connection (e.g., after performing the random access procedure 526). Thus, while the first node 502 and the second node 504 are attempting to establish a connection with each other, the first node 502 may be operating with a power mode configuration that is associated with reduced power savings compared to the power code configuration of the active power mode 514.

Aspects disclosed herein include techniques for the first node 502 to determine the active power mode 514 of the second node 504 prior to the first node 502 and the second node 504 establishing a connection (e.g., before the performing of the random access procedure 526 is complete). For example, the second node 504 may transmit and the first node 502 may receive the power mode indication 540 associated with the active power mode 514 before performing the random access procedure 526 and/or during the performing of the random access procedure 526. The first node 502 may then adapt its operation based on the indicated active power mode, which may provide increased power savings during the performing of the random access procedure 526 and/or after the performing of the random access procedure 526 is complete. The early indication (e.g., the power mode indication 540) may enable the first node 502 to adapt its configuration and/or behavior to operate according to the active power mode 514 of the second node 504.

As an example, if the active power mode indicates (e.g., based on the power mode indication 540) that the second node 504 is transmitting with a reduced transmission power, the first node 502 may monitor for repetitions of SSBs or identify other parameters that may assist the first node 502 in performing the random access procedure 526. In another example, if the active power mode indicates (e.g., based on the power mode indication 540) that the second node 504 is transmitting with a reduced quantity of active antennas, the first node 502 may determine that the beamforming capabilities of the second node 504 are reduced and, thus, the first node 502 may increase its transmitting power to facilitate performing the random access procedure 526. In another example, if the active power mode indicates (e.g., based on the power mode indication 540) that the second node 504 is transmitting with a reduced bandwidth, the first node 502 may determine that the second node 504 will spread its message across symbols in the time domain, which will increase the amount of time over which the message is being transmitted. In such an example, the first node 502 may adjust its power mode configuration to facilitate increasing its transmitting power and/or operating at a higher modulation and coding scheme (MCS) based on knowledge of the active power mode.

In some examples, the second node 504 may provide the early indication of the active power mode by adapting aspects of the SSB 520. For example, the second node adapt the synchronization signal 522 of the SSB 520 (e.g., at least one of the PSS 522*a* or the SSS 522*b*) to indicate the active power mode. In such examples, the synchronization signal 522 may correspond to the power mode indication 540. For example, different synchronization signals (e.g., the power mode indication 540) may map to different power modes. The second node 504 may generate the synchronization signal 522 to include in the SSB 520 based on the active power mode 514. The first node 502 may monitor for SSB s and, at 550, determine the active power mode based on the synchronization signal 522 detected by the first node 502. For example, at 552, the first node 502 may map the power mode indication 540 (e.g., the detected synchronization signal) to the active power mode 514 and a corresponding configuration. Thus, the power mode indication 540 may correspond to the synchronization signal 522 (e.g., the PSS 522*a* and/or the SSS 522*b*) of the SSB 520. That is, the synchronization signal 522, which the first node 502 may receive before the performing of the random access procedure 526 is complete, may provide an early indication to the first node 502 of the active power mode 514 of the second node 504 (e.g., before the first node 502 establishes the RRC connection with the second node 504).

In another example, different resources in the time domain and/or the frequency domain may be allocated to the synchronization signal 522 for the different power modes. For example, the second node 504 may transmit the synchronization signal 522 using resources 522*c* (e.g., time domain resources and/or frequency domain resources) based on the active power mode 514. The first node 502 may determine the active power mode based on the resources (e.g., at the time domain resources and/or the frequency domain resources) the synchronization signal 522 is detected. For example, the first node 502 may detect the synchronization signal 522 and determine the resources 522*c* at which the synchronization signal 522 is located (e.g., the power mode indication 540). At 552, the first node 502 may map the resources 522*c* to the active power mode 514 and the corresponding configuration. Thus, the power mode indication 540 may correspond to the resources 522*c* at which the first node 502 receives the synchronization signal 522. That is, the synchronization signal 522, which the first node 502 may receive before the performing of the random access procedure 526 is complete, may provide an early indication to the first node 502 of the active power mode 514 of the second node 504 (e.g., before the first node 502 establishes the RRC connection with the second node 504).

Aspects of providing the power mode indication 540 via the synchronization signal of an SSB (e.g., as the synchronization signal 522 or via the resources 522*c* associated with the synchronization signal 522) are described in connection with the example communication flow 600 of FIG. 6.

In some examples, the second node 504 may adapt a PBCH of an SSB (e.g., the PBCH 524 of the SSB 520) to indicate the active power mode 514. Similar to the synchronization signal 522, the first node 502 may receive the PBCH 524 before the performing of the random access procedure 526 is complete and, thus, the PBCH 524 may provide an early indication to the first node 502 of the active power mode 514 of the second node 504. As an example, the second node 504 may set the value of a power mode field 524*a* of the PBCH 524 based on the active power mode 514. The power mode field 524*a* may include one or more bits of a reserved field of the PBCH 524. The first node 502 may determine, at 550, the active power mode 514 by reading the value of the power mode field 524*a* after the SSB 520 is received. For example, at 552, the first node 502 may map the power mode indication 540 (e.g., the value of the power mode field 524*a*) to the active power mode 514 and a corresponding configuration. Thus, the power mode indication 540 may correspond to the power mode field 524*a* of the SSB 520. That is, the PBCH 524, which the first node 502 may receive before the performing of the random access procedure 526 is complete, may provide an early indication to the first node 502 of the active power mode 514 of the second node 504 (e.g., before the first node 502 establishes the RRC connection with the second node 504).

Aspects of providing the power mode indication 540 via the PBCH of an SSB (e.g., via the power mode field 524*a* of the PBCH 524 of the SSB 520) are described in connection with the example communication flow 700 of FIG. 7.

In some examples, the second node 504 may provide the early indication of the active power mode (e.g., the power mode indication 540) via a message of an access procedure (e.g., the random access procedure 526). For example, the second node 504 may receive a first random access message 528 from the first node 502 and transmit a second random access message 530 based on the first random access message 528. The second node 504 may also provide an indication of the active power mode 514 via the second random access message 530 (e.g., the power mode indication 540). For example, the second random access message 530 may include a power mode field 530*a* that the second node 504 may populate based on the active power mode 514. In some examples, the power mode field 530*a* may provide an explicit indication of the active power mode 514. In some examples, the power mode field 530*a* may indicate a set of power modes associated with a same configuration, and the set of power modes may include the active power mode 514. In some examples, the second node 504 may also provide a configuration of the active power mode 514 during the random access procedure 526.

As an example, the second node 504 may set the value of the power mode field 530*a* of the second random access message 530 based on the active power mode 514. The first node 502 may determine, at 550, the active power mode 514 by reading the value of the power mode field 530*a* after the second random access message 530 is received. For example, at 552, the first node 502 may map the power mode indication 540 (e.g., the value of the power mode field 530*a*) to the active power mode 514 and a corresponding configuration. Thus, the power mode indication 540 may correspond to the power mode field 530*a* of the second random access message 530. That is, the second random access message 530, which the first node 502 may receive before the performing of the random access procedure 526 is complete, may provide an early indication to the first node 502 of the active power mode 514 of the second node 504 (e.g., before the first node 502 establishes the RRC connection with the second node 504).

Aspects of providing the power mode indication 540 via the random access procedure e.g., via the power mode field 530*a* of the second random access message 530) are described in connection with the example communication flow 800 of FIG. 8A and the communication flow 850 of FIG. 8B.

At 550, the first node 502 determines the active power mode 514 of the second node 504 based on the power mode indication 540. For example, the first node 502 may monitor for SSBs and determine the active power mode 514 based on the synchronization signal 522 of the SSB 520 detected, for example, based on different reference signals. In another example, the first node 502 may determine the active power mode 514 of the second node 504 based on the resources 522*c* at which the synchronization signal 522 of the SSB 520 is detected. In another example, the first node 502 may determine the active power mode 514 of the second node 504 based on the power mode field 524*a* of the PBCH 524 of the SSB 520. In another example, the first node 502 may determine the active power mode 514 of the second node 504 based on the power mode field 530*a* of the second random access message 530 of the random access procedure 526.

At 552, the first node 502 may map the power mode indication 540 to the active power mode 514 and the corresponding configuration. At 560, the first node 502 may apply the configuration associated with the active power mode 514. The first node 502 and the second node 504 may transmit and receive the communication 570 based on the power mode configuration.

Figure 6:
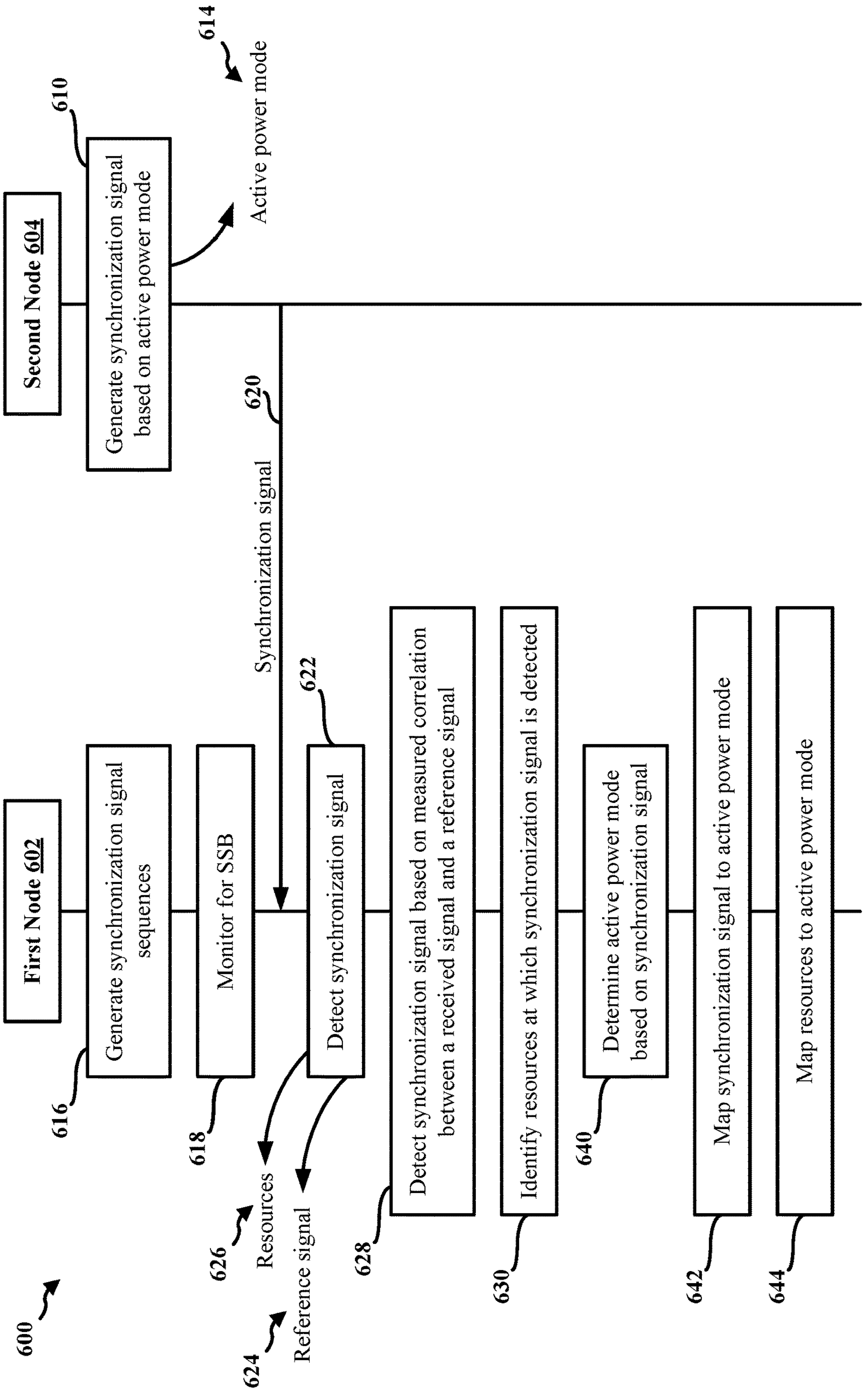
FIG. 6 is an example communication flow between a first node and a second node to facilitate an early indication of a power mode via a synchronization signal, in accordance with the teachings disclosed herein.

FIG. 6 is an example communication flow 600 between a first node 602 and a second node 604 to facilitate an early indication of a power mode via a synchronization signal, as presented herein. Aspects of the first node 602 may be implemented by the first node 502 of FIG. 5. Aspects of the second node 604 may be implemented by the second node 504 of FIG. 5. Although not shown in the illustrated example of FIG. 6, in additional or alternate examples, the first node 602 and/or the second node 604 may be in communication with other nodes, such as one or more other base stations or UEs.

In the illustrated example, the communication flow 600 facilitates the first node 602 receiving an indication of an active power mode via a synchronization signal 620. For example, at 610, the second node 604 may generate the synchronization signal 620 based on an active power mode 614 of the second node 604. Aspects of the active power mode 614 may be similar to the active power mode 514 of FIG. 5. The second node 604 may then transmit the synchronization signal 620 that is received by the first node 602. Aspects of the synchronization signal 620 may be based on the active power mode 614.

As shown at 618 of FIG. 6, the first node 602 monitors for SSBs. In some examples, the first node 602 may monitor for the SSBs based on comparing a received signal to a reference signal 624 corresponding to an SSB. For example, the reference signal 624 may correspond to a synchronization signal and enable the first node 602 to determine when a received signal is a synchronization signal by comparing the received signal to the reference signal 624. Additionally, or alternatively, the first node 602 may be configured with resources 626 at which a synchronization may be located. For example, when attempting to receive a synchronization signal, the first node 602 may monitor the resources 626 (e.g., time domain resources and/or frequency domain resources) for a received signal. The first node 602 may then determine if the received signal at the resources 626 is a synchronization signal by comparing the received signal with the reference signal 624 corresponding to the synchronization signal.

At 622, the first node 602 detects the synchronization signal 620. For example, the first node 602 may detect the synchronization signal 620 based on the reference signal 624 and/or the resources 626 associated with a received signal. At 640, the first node 602 may determine the active power mode 614 of the second node 604 based on the synchronization signal 620.

As described above, the first node 602 may detect the synchronization signal 620 based on the reference signal 624. In some examples, different synchronization signals may be used to indicate different respective active power modes of the second node 604. For example, FIG. 9A illustrates an example table 900 that maps reference signals 904 to power modes 906 and to power mode configurations 908, as presented herein. The reference signals 904 may correspond to the PSS sequence and/or SSS sequence of the synchronization signal 620. The power modes 906 and the power mode configurations 908 may correspond to a portion of the table 400 of FIG. 4 illustrating power mode configurations 404 corresponding to different power modes 402.

As shown in FIG. 9A, a first reference signal ("Signal 1") of the reference signals 904 maps to a first power mode ("Mode 1") of the power modes 906, which corresponds to a first configuration of the power mode configurations 908 (e.g., 128 active antennas). Similarly, other references signals of the reference signals 904 may map to other respective power modes of the power modes 906 and corresponding configurations of the power mode configurations 908. Thus, when the first node 602 determines that a received signal corresponds to the first reference signal, the first node 602 may also determine, based on the table 900 of FIG. 9A, the corresponding power mode and corresponding power mode configuration.

Returning to the example of FIG. 6, in some examples, the first node 602 may measure correlations between received signals and the reference signals 904 to determine when the received signal corresponds to a reference signal of the reference signals 904. For example, when the first node 602 receives a signal, the first node 602 may perform correlations between the received signal and each of the different reference signals of the reference signals 904 to determine if the received signal includes one of the different reference signals. For example, the first node 602 may perform correlations between the synchronization signal 620 and the different reference signals of the table 900 to determine if one of the three different reference signals corresponds to the received signal.

At 628, the first node 602 detects the synchronization signal 620 based on a measured correlation between a received signal and a reference signal. For example, the first node 602 may measure a correlation between the received signal and each of the reference signals of the reference signals 904 and determine that the measured correlations indicate that the received signal corresponds to a second reference signal 910 ("Signal 2"). At 640, the first node 602 determines the active power mode 614 of the second node 604 based on the synchronization signal 620. For example, at 642, the first node 602 may map the synchronization signal 620 to the corresponding power mode (e.g., "Mode 2") and the corresponding power mode configuration (e.g., 64 active antennas) based on the detected reference signal (e.g., the second reference signal 910).

In some examples, the first node 602 may be configured with the reference signals 904 mapping to the different power modes. In some examples, the first node 602 may be configured with sequence seeds that enable the first node 602 to generate the different reference signals. For example, at 616, the first node 602 may generate the different reference signals (e.g., at least one of a PSS sequence or an SSS sequence). The first node 602 may generate the reference signals 904 based on different respective sequence seeds that map to the different reference signals 904. As shown in FIG. 9A, the table 900 includes sequence seeds 902 that map to a respective reference signal ("Signal 2") and corresponding power mode ("Mode 2") and corresponding power mode configuration (e.g., 64 active antennas). The different sequence seeds of the sequence seeds 902 may be inputs to a function to generate a respective reference signal. Thus, a first sequence seed ("Seed 1") may be input to the function to generate the first reference signal ("Signal 1"). In the illustrated example of FIG. 9A, the second reference signal 910 may be generated by inputting a second sequence seed ("Seed 2") to the function.

At 640, the first node 602 may determine the active power mode 614 of the second node 604 based on the synchronization signal 620. For example, at 642, the first node 602 may map the synchronization signal 620 to the corresponding power mode (e.g., "Mode 2") and the corresponding power mode configuration (e.g., 64 active antennas) based on the detected reference signal (e.g., the second reference signal 910) and the corresponding sequence seed (e.g., "Seed 2"). That is, the first node 602 may determine which reference signal of the reference signals 904 has the highest measured correlation with a received signal, determine which sequence seed was used to generate the respective reference signal, and then map the respective sequence seed to the corresponding power mode (e.g., "Mode 2") and the corresponding power mode configuration (e.g., 64 active antennas).

In some examples, the first node 602 may detect the synchronization signal 620 based on the resources 626. For example, different time-frequency resources for the synchronization signal 620 may be allocated for different active power modes. For example, FIG. 9B illustrates an example table 920 that maps resources 922 to power modes 924 and to power mode configurations 926, as presented herein. The resources 922 may correspond to the time-frequency resources allocated to the PSS sequence and/or the SSS sequence of the synchronization signal 620. The power modes 924 and the power mode configurations 926 may correspond to a portion of the table 400 of FIG. 4 illustrating power mode configurations 404 corresponding to different power modes 402.

As shown in FIG. 9B, a reference resource ("Resource 1") of the resources 922 maps to a first power mode ("Mode 1") of the power modes 924, which corresponds to a first configuration of the power mode configurations 926 (e.g., 128 active antennas). Similarly, other resources of the resources 922 may map to other respective power modes of the power modes 924 and corresponding configurations of the power mode configurations 926. Thus, when the first node 602 determines that the synchronization signal 620 is located at the first resource, the first node 602 may also determine, based on the table 920 of FIG. 9B, the corresponding power mode and corresponding power mode configuration.

Returning to the example of FIG. 6, the first node 602 may measure correlations between received signals the reference signal 624 to determine when the received signal corresponds to the reference signal 624. The reference signal 624 may include a reference synchronization signal that the first node 602 may use to detect when a received signal includes the synchronization signal 620.

At 628, the first node 602 detects the synchronization signal 620 based on a measured correlation between a received signal and the reference signal 624. At 630, the first node 602 identifies the resources 626 at which the synchronization signal 620 is detected. The resources 626 may include time domain resources and/or frequency domain resources. For example, the first node 602 may determine that the synchronization signal 620 corresponds to second resources 928 ("Resource 2"). At 640, the first node 602 determines the active power mode 614 of the second node 604 based on the synchronization signal 620. For example, at 644, the first node 602 may map the synchronization signal 620 to the corresponding power mode (e.g., "Mode 2") and the corresponding power mode configuration (e.g., 64 active antennas) based on the resources 626 (e.g., the second resources 928).

After determining, at 640, the active power mode 614 of the second node 604 (e.g., based on the reference signal 624 or the resources 626 associated with the synchronization signal 620), the first node 602 may apply a configuration associated with the active power mode and communicate with the second node 604 based on the active power mode, as described in connection with 560 and the communication 570 of FIG. 5. The first node 602 may adapt to the operation of the second node 604 according to the active power mode 614. For example, the first node 602 may transmit a first message of a random access procedure according to the active power mode indicated via the synchronization signal 620.

Figure 7:
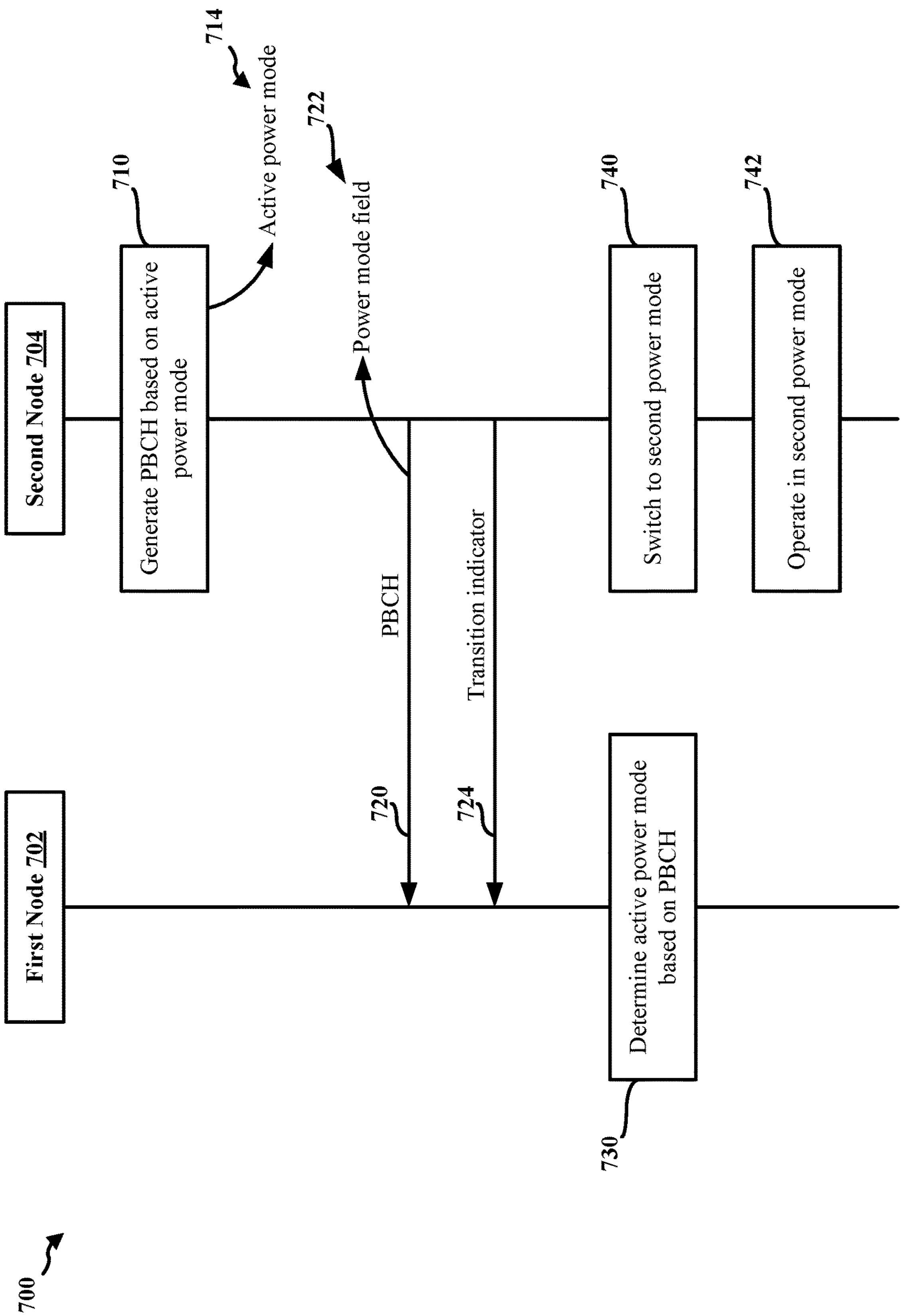
FIG. 7 is an example communication flow between a first node and a second node to facilitate an early indication of a power mode via a PBCH, in accordance with the teachings disclosed herein.

FIG. 7 is an example communication flow 700 between a first node 702 and a second node 704 to facilitate an early indication of a power mode via a PBCH, as presented herein. Aspects of the first node 702 may be implemented by the first node 502 of FIG. 5. Aspects of the second node 704 may be implemented by the second node 504 of FIG. 5. Although not shown in the illustrated example of FIG. 7, in additional or alternate examples, the first node 702 and/or the second node 704 may be in communication with other nodes, such as one or more other base stations or UEs.

In the illustrated example of FIG. 7, the communication flow 700 facilitates the first node 702 receiving an indication of an active power mode of the second node 704 via a PBCH 720. For example, at 710, the second node 704 may generate the PBCH 720 based on an active power mode 714 of the second node 704. Aspects of the active power mode 714 may be similar to the active power mode 514 of FIG. 5. The second node 704 may then transmit the PBCH 720 that is received by the first node 702. Aspects of the PBCH 720 may be based on the active power mode 714. The PBCH 720 may be included in an SSB, as described in connection with the PBCH 524 of the SSB 520 of FIG. 5.

As shown in FIG. 7, the PBCH 720 includes a power mode field 722. The power mode field 722 may indicate the active power mode 714. Aspects of the power mode field 722 may be similar to the power mode field 524*a* and correspond to the power mode indication 540 of FIG. 5. The power mode field 722 may include one or more bits of a reserved field of the PBCH 720. In some examples, the value of the power mode field 722 may indicate the active power mode 714. For example, a first value may indicate that a first power mode is active, a second value may indicate that a second power mode is active, etc.

At 730, the first node 702 may determine the active power mode based on the PBCH 720. In some examples, the first node 702 may map the value of the power mode field 722 to an active power mode. For example, FIG. 9C illustrates an example table 940 that maps power mode field values 942 to power modes 944 and to power mode configurations 946, as presented herein. The power mode field values 942 may correspond to the value of the power mode field 722 of the PBCH 720. The power modes 944 and the power mode configurations 946 may correspond to a portion of the table 400 of FIG. 4 illustrating power mode configurations 404 corresponding to different power modes 402.

As shown in FIG. 9C, a first value ("01") of the power mode field values 942 maps to a first power mode ("Mode 1") of the power modes 944, which corresponds to a first configuration of the power mode configurations 946 (e.g., 128 active antennas). Similarly, other values of the power mode field values 942 may map to other respective power modes of the power modes 944 and corresponding configurations of the power mode configurations 946. Thus, when the first node 702 determines that the power mode field 722 of the PBCH 720 corresponds to the first value, the first node 702 may also determine, based on the table 940 of FIG. 9C, the corresponding power mode and corresponding power mode configuration.

Returning to the example of FIG. 7, after determining the active power mode, at 730, the first node 702 may apply a configuration associated with the active power mode and communicate with the second node 704 based on the power mode configuration, as described in connection with 560 and the communication 570 of FIG. 5. The first node 702 may adapt to the operation of the second node 704 according to the active power mode 714. For example, the first node 702 may transmit a first message of a random access procedure according to the active power mode indicated via the power mode field 722 of the PBCH 720.

In some examples, the second node 704 may transmit a transition indicator 724 that is received by the first node 702. The transition indicator 724 may be included in the PBCH 720. The transition indicator 724 may indicate to the first node 702 that the second node 704 is switching to a different power mode. The determination to switch to a different power mode may be based on network input. The transition indicator 724 may indicate the switch to the first node 702 so that the first node 702 will be aware that the second node 704 will switch between power mode configurations.

The second node 704 may then switch to operation based on the second power mode configuration, at 740, and may operate in the second power mode at 742. For example, the second power mode configuration may have a different number of active antennas, a different transmission power, a different bandwidth, a different number of CCs, etc. than the first power mode configuration.

In examples in which the first node 702 receives the transition indicator 724, the first node 702 may determine the active power mode based on the transition indicator 724. For example, the first node 702 may apply a corresponding power mode configuration or behavior based on the second power mode configuration indicated by the transition indicator 724. In some examples, the first node 702 may first apply a power mode configuration or behavior corresponding to a first power mode (e.g., the active power mode 714), as indicated by the power mode field 722, and then apply a second power mode configuration or behavior corresponding to the second power mode, for example, based on a timing parameter included with the transition indicator 724.

After determining the active power mode, at 730, the first node 702 may apply a configuration associated with the active power mode and communicate with the second node 704 based on the active power mode, as described in connection with 560 and the communication 570 of FIG. 5. The first node 702 may adapt to the operation of the second node 704 according to the active power mode indicated by the transition indicator 724. For example, the first node 702 may transmit a first message of a random access procedure according to the active power mode indicated via the transition indicator 724.

Figure 8A:
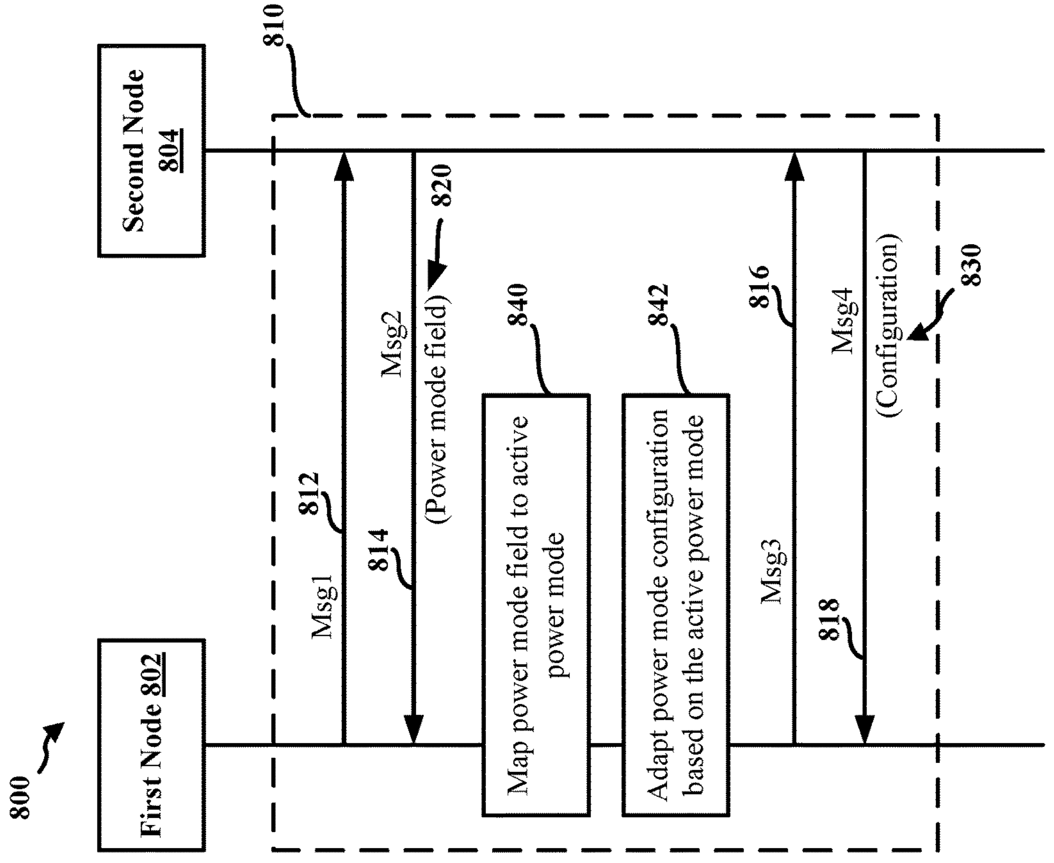
FIG. 8A is an example communication flow between a first node and a second node to facilitate an early indication of a power mode while performing a four-step random access procedure, in accordance with the teachings disclosed herein.

FIG. 8A is an example communication flow 800 between a first node 802 and a second node 804 to facilitate an indication of an active power mode of the second node 804 while performing a four-step random access procedure, as presented herein. FIG. 8B is an example communication flow 850 between the first node 802 and the second node 804 to facilitate an indication of an active power mode of the second node 804 while performing a two-step random access procedure, as presented herein. Aspects of the first node 802 may be implemented by the first node 502 of FIG. 5. Aspects of the second node 804 may be implemented by the second node 504 of FIG. 5. Although not shown in the illustrated examples of FIGS. 8A and 8B, in additional or alternate examples, the first node 802 and/or the second node 804 may be in communication with other nodes, such as one or more other base stations or UEs.

Figure 8B:
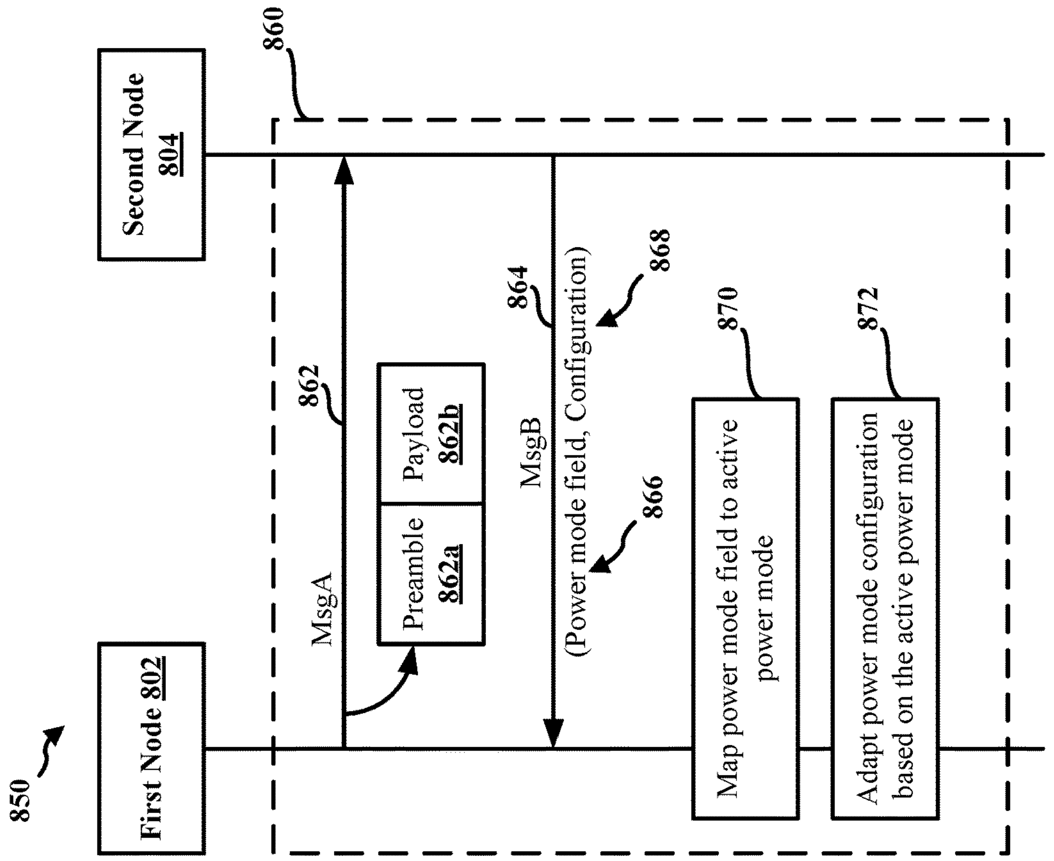
FIG. 8B is an example communication flow between a first node and a second node to facilitate an early indication of a power mode while performing a two-step random access procedure, in accordance with the teachings disclosed herein.

In the illustrated examples of FIGS. 8A and 8B, the communication flows facilitate the first node 802 receiving an early indication of the power mode of the second node 804 via a random access message. The random access message may include an indication of the active power mode so that the first node 802 may adapt its operation according to the active power mode.

In the illustrated example of FIG. 8A, the first node 802 and the second node 804 perform a four-step RACH procedure 810 that includes the exchange of four messages. Specifically, the first node 802 may initiate the message exchange of the four-step RACH procedure 810 by sending, to the second node 804, a first four-step RACH message (e.g., a Msg1 812) including a preamble (e.g., without a payload). The second node 804 then sends, to the first node 802, a second four-step RACH message (e.g., a Msg2 814) including a random access response (RAR). In some aspects, the Msg2 814 may include an identifier of the RACH preamble, a timing advance (TA), an uplink grant for the first node 802 to transmit data, cell radio network temporary identifier (C-RNTI), and/or a back-off indicator. The RACH preamble identifier may assist in conflict resolution. The first node 802 then sends a third four-step RACH message (e.g., a Msg3 816) to the second node 804. In some aspects, the Msg3 816 may include an RRC connection request, an RRC connection re-establishment request, or an RRC connection resume request, depending on the trigger for the first node 802 initiating the random access procedure. The second node 804 then completes the four-step RACH procedure 810 by sending a fourth four-step RACH message (e.g., a Msg4 818) to the first node 802. In some aspects, the Msg4 818 includes timing advancement information, contention resolution information, and/or RRC connection setup information.

Although not shown in the example of FIG. 8A, in some examples, the first node 802 may re-transmit a RACH message. For example, in some aspects, after transmitting the Msg1 812, the first node 802 may re-transmit (e.g., periodically, a-periodically, and/or as a one-time event) the Msg1 812. In some examples, the first node 802 may re-transmit the Msg1 812 until the Msg2 814 is received from the second node 804 and/or a timer expires. In other examples, the RACH message received by the first node 802 (e.g., the Msg2 814 and/or the Msg4 818) may indicate that the second node 804 is unable to process (e.g., decode) at least a portion of a RACH message transmitted by the first node 802. In some such examples, the first node 802 may then re-transmit the corresponding RACH message.

As shown in FIG. 8A, the second node 804 may transmit the Msg2 814 including a power mode field 820. The power mode field 820 may be similar to the power mode indication 540 of the second random access message 530 of FIG. 5 and provide an early indication of the active power mode of the second node 804. In some examples, the power mode field 820 may provide an explicit indication of the active power mode, as described in connection with the table 940 of FIG. 9C. For example, if the second node 804 has the capability to operate in 16 different power modes, the power mode field 820 may comprise four bits to indicate which of the 16 different power modes is the active power mode.

In other examples, the power mode field 820 may indicate a set of multiple power modes including an active power mode. The set of multiple power modes may include a shared power mode configuration. For example, FIG. 9D illustrates a table 960 that maps values 962 to sets of power modes 964 and power mode configurations 966, as presented herein. The values 962 may correspond to the value of the power mode field 820 of the Msg2 814. For example, a first value of the values 962 (e.g., a "0") corresponds to power modes 0 to 7 and maps to a first configuration ("Configuration A"), and a second value of the values 962 (e.g., a "1") corresponds to power modes 8 to 15 and maps to a second configuration ("Configuration B"). The power modes associated with the first configuration may include a shared power mode configuration, such as a common quantity of active antennas, a common transmission power, a common bandwidth, a common number of CCs, etc. The shared power mode configuration may be common for one or more network nodes, including the first node 802.

Returning to the example of FIG. 8A, at 840, the first node 802 maps the power mode field to the active power mode of the second node 804. For example, based on the value of the power mode field 820 and the table 940 or the table 960, the first node 802 may determine the active power mode of the second node 804. At 842, the first node 802 may then adapt its power mode configuration and/or behavior according to the active power mode indicated by the power mode field 820. For example, the first node 802 may transmit the Msg3 816 to the second node 804 based on the active power mode. In such examples, the Msg3 816 and the Msg4 818 may correspond to the communication 570 of FIG. 5.

In some examples, the second node 804 may provide a power mode configuration that is received by the first node 802. For example, the second node 804 may transmit the Msg4 818 and include a configuration 830. The configuration 830 may be similar to the configuration 532 of FIG. 5. In such examples, the first node 802 may apply the power mode configuration indicated by the configuration 830 and communicate with the second node 804 based on the configuration 830, as described in connection with 560 and the communication 570 of FIG. 5.

In the illustrated example of FIG. 8B, the first node 802 and the second node 804 are performing a two-step RACH procedure 860 that includes the exchange of two messages. Specifically, the first node 802 may initiate the message exchange of the two-step RACH procedure 860 by sending a first two-step RACH message (e.g., a MsgA 862) to the second node 804. Responsive to the MsgA 862, the second node 804 may complete the message exchange of the two-step RACH procedure 860 by sending a second two-step RACH message (e.g., a MsgB 864) to the first node 802.

In some aspects, to initiate the two-step RACH procedure 860, the first node 802 may generate the MsgA 862. For the two-step RACH procedure 860, the first node 802 may generate the MsgA 862 to include at least a preamble 862*a* (e.g., a PRACH preamble) and a payload 862*b*. In some aspects, the preamble 862*a* may correspond to the Msg1 812 and the payload 862*b* may correspond to the Msg3 816 of the four-step RACH procedure 810 of FIG. 8A.

The first node 802 may be identified by the second node 804 according to an identifier (ID) of the first node 802, such as a radio network temporary identifier (RNTI) (e.g., a random access (RA) RNTI, a temporary RNTI, etc.). The MsgA 862 may be the first transmission by the first node 802 to the second node 804 and, therefore, the second node 804 may benefit from a mechanism for indicating the ID of the first node 802 to the second node 804 in the MsgA 862, particularly because the MsgA 862 may include data from the first node 802 in the payload 862*b*. Accordingly, the first node 802 may indicate an ID of the first node 802 using one or more (or a combination of) approaches for including information in the MsgA 862.

In response to receiving the MsgA 862, the second node 804 may generate the MsgB 864. The second node 804 may generate the MsgB 864 to include control information in a PDCCH and data in a PDSCH. The second node 804 may send the MsgB 864 to the first node 802 to complete the two-step RACH procedure 860. In some aspects, information included in the MsgB 864 may correspond to the Msg2 814 and the Msg4 818 of the four-step RACH procedure 810 of FIG. 8A. The first node 802 may receive the MsgB 864, and the first node 802 may acquire timing synchronization based on the MsgB 864.

Although not shown in the example of FIG. 8B, in some aspects, the first node 802 may re-transmit a RACH message. For example, in some aspects, after transmitting the MsgA 862, the first node 802 may re-transmit (e.g., periodically, a-periodically, and/or as a one-time event) the MsgA 862. The first node 802 may re-transmit the MsgA 862 until the MsgB 864 is received from the second node 804 and/or a timer expires. In some examples, the RACH response message received by the first node 802 (e.g., the MsgB 864) may indicate that the second node 804 is unable to process (e.g., decode) at least a portion of the RACH message. In some such examples, the first node 802 may then re-transmit the corresponding RACH message. For example, the second node 804 may transmit a RACH message indicating that the second node 804 is unable to decode the payload 862*b* of the MsgA 862 and the first node 802 may re-transmit the MsgA 862.

While the two-step RACH procedure 860 of FIG. 8B differs in some aspects from the four-step RACH procedure 810 of FIG. 8A, some aspects may be common across the RACH procedures. For example, sequences associated with a physical RACH (PRACH) and sequences associated with DMRS used for the four-step RACH procedure 810 may also be used for the two-step RACH procedure 860.

Similar to the example of FIG. 8A, the second node 804 may transmit a message including an indication of the active power mode. For example, the second node 804 may transmit the MsgB 864 including a power mode field 866. The power mode field 866 may be similar to the power mode indication 540 and provide an early indication of the active power mode of the second node 804. In some examples, the power mode field 866 may provide an explicit indication of the active power mode of the second node 804, as described in connection with the table 940 of FIG. 9C. In other examples, the power mode field 866 may indicate a set of multiple power modes including an active power mode. The set of multiple power modes may include a shared power mode, as described in connection with the table 960 of FIG. 9D. For example, the values 962 may correspond to the value of the power mode field 866 of the MsgB 864.

At 870, the first node 802 maps the power mode field to the active power mode of the second node 804. For example, based on the value of the power mode field 866 and the table 940 or the table 960, the first node 802 may determine the active power mode of the second node 804. At 872, the first node 802 may then adapt its power mode configuration and/or behavior according to the active power mode indicated by the power mode field 866. For example, the first node 802 may apply the power mode configuration and communicate with the second node 804 based on the active power mode, as described in connection with 560 and the communication 570 of FIG. 5.

In some examples, the second node 804 may provide a power mode configuration that is received by the first node 802. For example, the second node 804 may include a configuration 868 with the MsgB 864. The configuration 868 may be similar to the configuration 532 of FIG. 5. In such examples, the first node 802 may apply the power mode configuration indicated by the configuration 868 and communicate with the second node 804 based on the configuration 868, as described in connection with 560 and the communication 570 of FIG. 5.

Figure 10B:
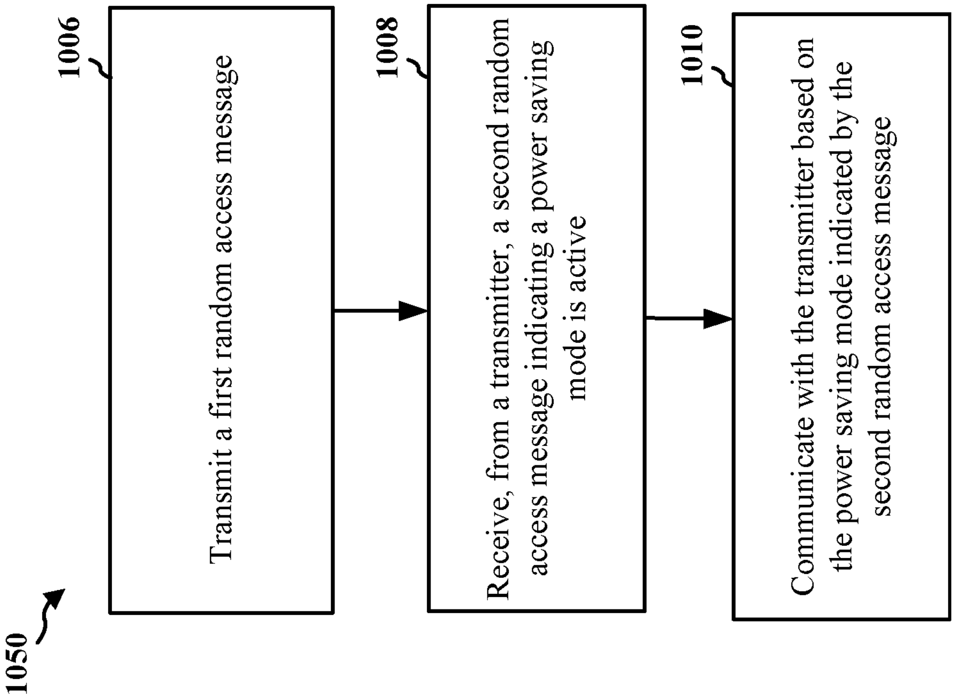
FIG. 10B is a flowchart of a method of wireless communication at a receiver, in accordance with the teachings disclosed herein.
Figure 10A:
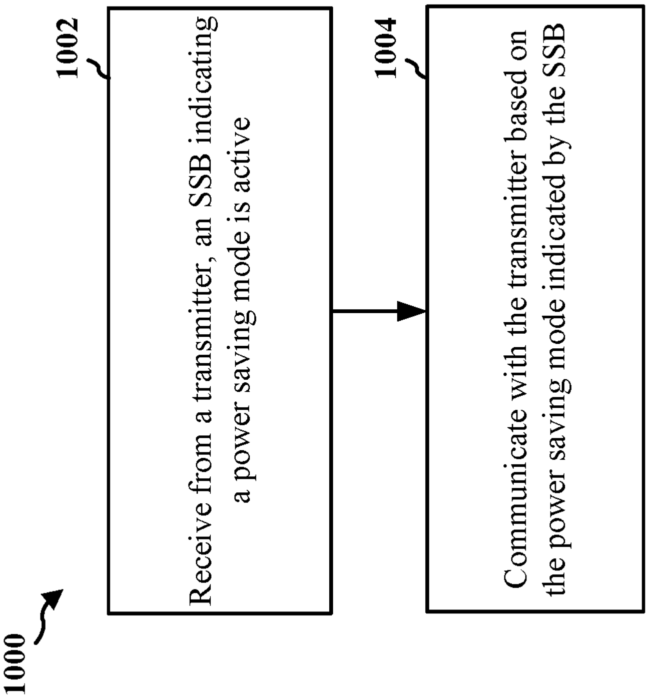
FIG. 10A is a flowchart of a method of wireless communication at a receiver, in accordance with the teachings disclosed herein.

FIG. 10A is a flowchart 1000 of a method of wireless communication. The method may be performed by a receiver. In some aspects, the method may be performed by a UE or a component of a UE (e.g., the UE 104; the second wireless device 350; the apparatus 1102). The receiver may receive communication from a transmitter. In some aspects, the transmitter may be a network node, such as a base station or a component of a base station (e.g., the base station 102/180 or a component of the base station 102/180; the first wireless device 310; the apparatus 1302). In other aspects, the transmitter may be a second UE or a component of a second UE (e.g., a UE 104, the second wireless device 350; the apparatus 1302). The method may enable a receiver to determine that a transmitter has an active power saving mode. In some aspects, the method may enable the receiver to determine a particular power savings mode among multiple power savings modes. The power saving mode may include one or more of a reduced bandwidth, a reduced number of active antennas, a reduced transmission power, among other examples of a reduced power mode. The receiver may adjust for the reduced power mode of the transmitter, e.g., looking for repetitions of an SSB or adjusting for a smaller bandwidth or transmission power of the transmitter. The adaptation based on a knowledge of the power saving mode of the transmitter may increase reliability, reduce latency, and improve coverage between the transmitter and the receiver.

At 1002, the receiver receives, from a transmitter, an SSB indicating a power saving mode is active. The reception may be performed, e.g., by the SSB component 1140 of the apparatus 1102 in FIG. 11. The power saving mode may be one of multiple power saving modes. The SSB may include a PSS and an SSS, e.g., as described in connection with FIG. 2B. In some aspects, at least one of a PSS sequence or an SSS sequence in the SSB indicates the power saving mode is active. For example, the power saving mode may be one of multiple power saving modes, each of the multiple power saving modes being associated with a different seed for at least one of the PSS sequence or the SSS sequence. In some aspects, at least one of a time domain resource or a frequency domain resource of the SSB indicates the power saving mode is active. For example, the power saving mode may be one of multiple power saving modes, each of the multiple power saving modes being associated with one or more of a different time domain resource or a different frequency domain resource. In some aspects, the SSB may include a PBCH, e.g., as described in connection with FIG. 2B, and the PBCH may indicate that the power saving mode is active. For example, the PBCH may include a field indicating an active power saving mode. As another example, the PBCH may further indicate a transition to a different power saving mode.

At 1004, the receiver communicates with the transmitter based on the power saving mode indicated by the SSB. The communication may be performed, e.g., by the power saving mode component 1142 of the apparatus 1102 in FIG. 11. The receiver may adjust for the power saving mode of the transmitter, e.g., looking for repetitions of an SSB or adjusting for a smaller bandwidth or transmission power of the transmitter. The adaptation based on a knowledge of the transmitter's power saving mode may increase reliability, reduce latency, and improve coverage between the transmitter and the receiver.

FIG. 10B is a flowchart 1050 of a method of wireless communication. The method may be performed by a receiver. In some aspects, the method may be performed by a UE or a component of a UE (e.g., the UE 104; the second wireless device 350; the apparatus 1102). The receiver may receive communication from a transmitter. In some aspects, the transmitter may be a network node, such as a base station or a component of a base station (e.g., the base station 102/180 or a component of the base station 102/180; the first wireless device 310; the apparatus 1302). In other aspects, the transmitter may be a second UE or a component of a second UE (e.g., a UE 104, the second wireless device 350; the apparatus 1302). The method may enable a receiver to determine that a transmitter has an active power saving mode. In some aspects, the method may enable the receiver to determine a particular power savings mode among multiple power savings modes. The power saving mode may include one or more of a reduced bandwidth, a reduced number of active antennas, a reduced transmission power, among other examples of a reduced power mode. The receiver may adjust for the reduced power mode of the transmitter, e.g., looking for repetitions of an SSB or adjusting for a smaller bandwidth or transmission power of the transmitter. The adaptation based on a knowledge of the power saving mode of the transmitter may increase reliability, reduce latency, and improve coverage between the transmitter and the receiver.

At 1006, the receiver transmits a first random access message. The transmission may be performed, e.g., by the random access component 1144 of the apparatus 1102 in FIG. 11. For example, the first random access message may be a Msg 1 in a four-step random access procedure or may be a MsgA in a two-step random access procedure.

At 1008, the receiver receives, from a transmitter, a second random access message indicating a power saving mode is active. The reception may be performed, e.g., by the random access component 1144 of the apparatus 1102 in FIG. 11. In some aspects, the second random access message may indicate a set of multiple power saving modes including an active power saving mode, the set of multiple power saving modes including a shared power saving mode parameter. In some aspects, the second random access message may indicate a single power saving mode. In some aspects, the second random access message may include a Msg4 in a four-step random access procedure or a MsgB in a two-step random access procedure.

At 1010, the receiver communicates with the transmitter based on the power saving mode indicated by the second random access message. The communication may be performed, e.g., by the power saving mode component 1142 of the apparatus 1102 in FIG. 11. The receiver may adjust for the power saving mode of the transmitter, e.g., looking for repetitions of an SSB or adjusting for a smaller bandwidth or transmission power of the transmitter. The adaptation based on a knowledge of the transmitter's power saving mode may increase reliability, reduce latency, and improve coverage between the transmitter and the receiver.

Figure 11:
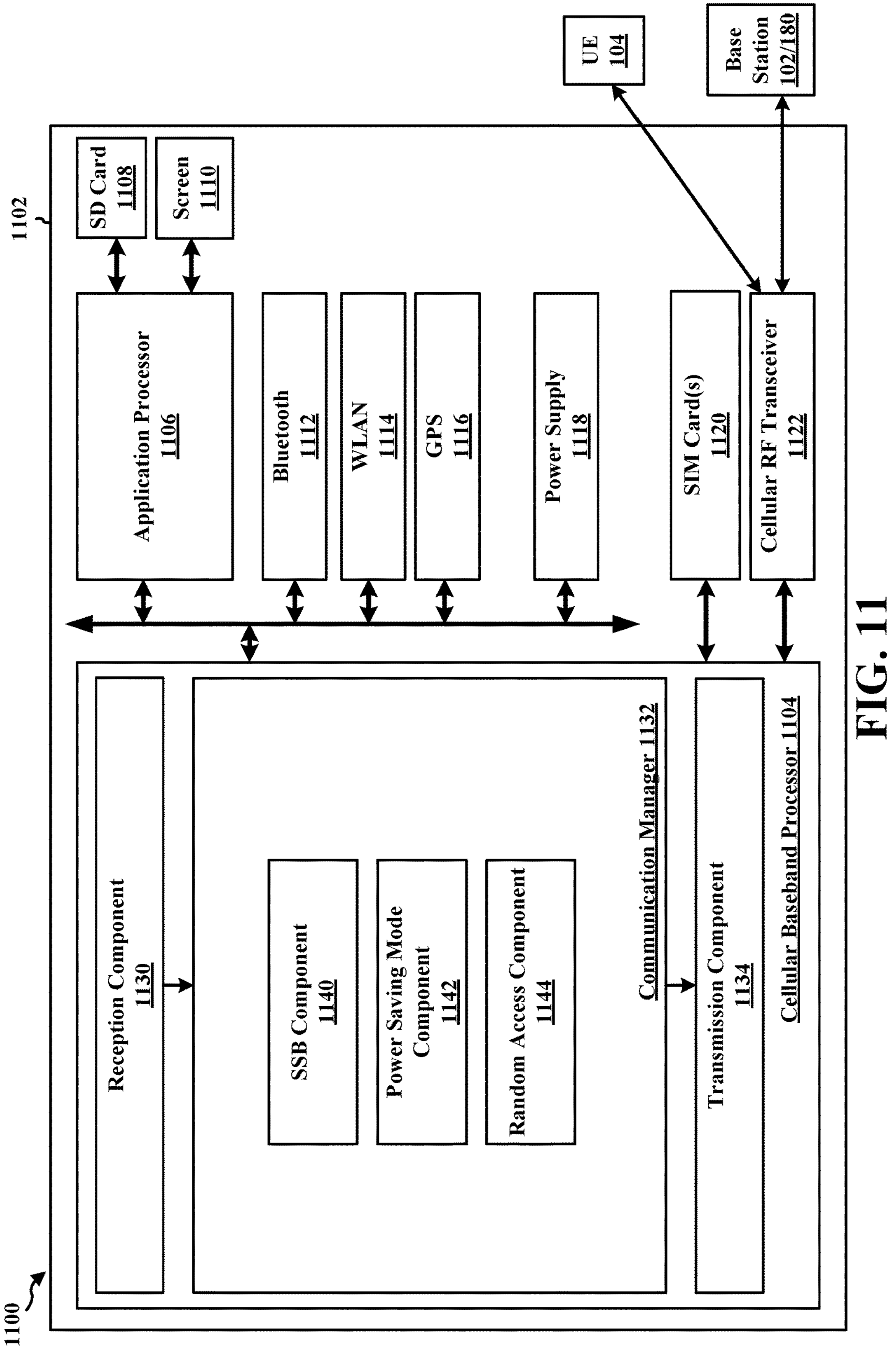
FIG. 11 is a diagram illustrating an example of a hardware implementation for an example apparatus, in accordance with the teachings disclosed herein.

FIG. 11 is a diagram 1100 illustrating an example of a hardware implementation for an apparatus 1102. The apparatus may be configured to perform the method of FIG. 10A and/or 10B. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or the base station 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the second wireless device 350 and may include the memory 360 and/or at least one of the TX processor 368, the RX processor 356, and the controller/processor 359. In one configuration, the apparatus 1102 may be a modem chip and include just the cellular baseband processor 1104, and in another configuration, the apparatus 1102 may be the entire UE (e.g., see the second wireless device 350 of FIG. 3) and include the additional modules of the apparatus 1102.

The communication manager 1132 includes an SSB component 1140 that is configured to receive, from a transmitter, an SSB indicating a power saving mode is active, e.g., as described in connection with 1002 in FIG. 10A. The communication manager 1132 further includes a power saving mode component 1142 that is configured to communicate with the transmitter based on the power saving mode indicated by the SSB, e.g., as described in connection with 1004 in FIG. 10A and/or to communicate with the transmitter based on the power saving mode indicated by the second random access message, e.g., as described in connection with 1010 in FIG. 10B. The communication manager 1132 further includes a random access component 1144 that is configured to transmit a first random access message and receive a second random access message indicating a power saving mode is active, e.g., as described in connection with 1006 and 1008 in FIG. 10B.

The apparatus may include additional components that perform each of the blocks of the algorithm in the flowcharts of FIGS. 10A and/or 10B. As such, each block in the flowcharts of FIGS. 10A and/or 10B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, may include means for receiving, from a transmitter, an SSB indicating a power saving mode is active; and means for communicating with the transmitter based on the power saving mode indicated by the SSB. In some aspects, the apparatus 1102 may include means for transmitting a first random access message; means for receiving, from a transmitter, a second random access message indicating a power saving mode is active; and means for communicating with the transmitter based on the power saving mode indicated by the second random access message. The means may be one or more of the components of the apparatus 1102 configured to perform the functions recited by the means. As described supra, the apparatus 1102 may include the TX processor 368, the RX processor 356, and the controller/processor 359. As such, in one configuration, the means may be the TX processor 368, the RX processor 356, and the controller/processor 359 configured to perform the functions recited by the means.

Figure 12A:
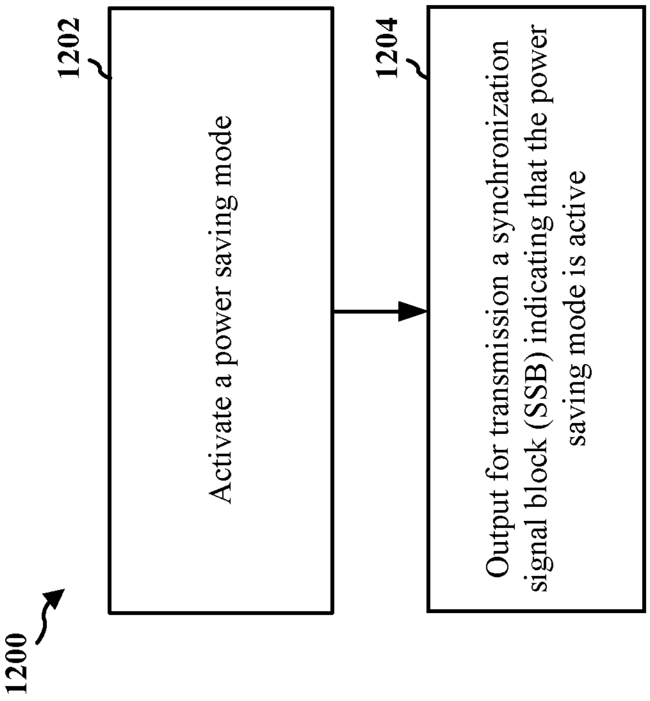
FIG. 12A is a flowchart of a method of wireless communication at a transmitter, in accordance with the teachings disclosed herein.

FIG. 12A is a flowchart 1200 of a method of wireless communication. The method may be performed by a transmitter. In some aspects, the transmitter may be a network node, such as a base station or a component of a base station (e.g., the base station 102/180 or a component of the base station 102/180; the first wireless device 310; the apparatus 1302). In other aspects, the transmitter may be a second UE or a component of a second UE (e.g., a UE 104, the second wireless device 350; the apparatus 1302). In some aspects, the receiver may be a UE or a component of a UE (e.g., the UE 104; the second wireless device 350; the apparatus 1102). The method may enable the transmitter to signal to potential receivers that the transmitter has an active power saving mode. In some aspects, the method may enable the transmitter to indicate a particular power savings mode among multiple power savings modes. The power saving mode may include one or more of a reduced bandwidth, a reduced number of active antennas, a reduced transmission power, among other examples of a reduced power mode. The information regarding the power saving mode may improve communication between a transmitter and a receiver and may enable a receiver to adjust for the reduced power mode of the transmitter, e.g., looking for repetitions of an SSB or adjusting for a smaller bandwidth or transmission power of the transmitter. The adaptation based on a knowledge of the power saving mode of the transmitter may increase reliability, reduce latency, and improve coverage between the transmitter and the receiver.

At 1202, the transmitter activates a power saving mode. The power saving mode may include one or more of a reduced bandwidth, a reduced number of active antennas, a reduced transmission power, among other examples of a reduced power mode. The activation of the power saving mode may be performed, e.g., by the power saving mode component 1342 of the apparatus 1302 in FIG. 13.

At 1204, the transmitter outputs a synchronization signal block (SSB) indicating that the power saving mode is active. The transmission may be performed, e.g., by the SSB component 1340 of the apparatus 1302 in FIG. 13. The power saving mode may be one of multiple power saving modes. The SSB may include a PSS and an SSS, e.g., as described in connection with FIG. 2B. In some aspects, at least one of a PSS sequence or an SSS sequence in the SSB indicates the power saving mode is active. For example, the power saving mode may be one of multiple power saving modes, each of the multiple power saving modes being associated with a different seed for at least one of the PSS sequence or the SSS sequence. In some aspects, at least one of a time domain resource or a frequency domain resource of the SSB indicates the power saving mode is active. For example, the power saving mode may be one of multiple power saving modes, each of the multiple power saving modes being associated with one or more of a different time domain resource or a different frequency domain resource. In some aspects, the SSB may include a PBCH, e.g., as described in connection with FIG. 2B, and the PBCH may indicate that the power saving mode is active. For example, the PBCH may include a field indicating an active power saving mode. As another example, the PBCH may further indicate a transition to a different power saving mode.

Figure 12B:
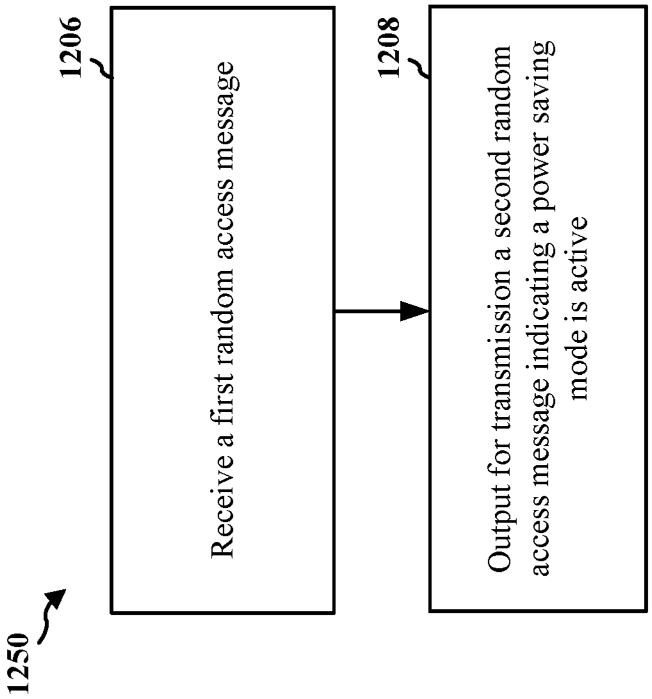
FIG. 12B is a flowchart of a method of wireless communication at a transmitter, in accordance with the teachings disclosed herein.

FIG. 12B is a flowchart 1250 of a method of wireless communication. The method may be performed by a transmitter. In some aspects, the transmitter may be a network node, such as a base station or a component of a base station (e.g., the base station 102/180 or a component of the base station 102/180; the first wireless device 310; the apparatus 1302). In other aspects, the transmitter may be a second UE or a component of a second UE (e.g., a UE 104, the second wireless device 350; the apparatus 1302). In some aspects, the receiver may be a UE or a component of a UE (e.g., the UE 104; the second wireless device 350; the apparatus 1102). The method may enable the transmitter to signal to potential receivers that the transmitter has an active power saving mode. In some aspects, the method may enable the transmitter to indicate a particular power savings mode among multiple power savings modes. The power saving mode may include one or more of a reduced bandwidth, a reduced number of active antennas, a reduced transmission power, among other examples of a reduced power mode. The information regarding the power saving mode may improve communication between a transmitter and a receiver and may enable a receiver to adjust for the reduced power mode of the transmitter, e.g., looking for repetitions of an SSB or adjusting for a smaller bandwidth or transmission power of the transmitter. The adaptation based on a knowledge of the power saving mode of the transmitter may increase reliability, reduce latency, and improve coverage between the transmitter and the receiver.

At 1206, the transmitter obtains a first random access message. The obtaining may be performed, e.g., by the random access component 1344 of the apparatus 1302 in FIG. 13. The first random access message may be a Msg 1 in a four-step random access procedure or may be a MsgA in a two-step random access procedure.

At 1208, the transmitter outputs a second random access message indicating a power saving mode is active. The outputting may be performed, e.g., by the random access component 1344 of the apparatus 1302 in FIG. 13. In some aspects, the second random access message may indicate a set of multiple power saving modes including an active power saving mode, the set of multiple power saving modes including a shared power saving mode parameter. In some aspects, the second random access message may indicate a single power saving mode. In some aspects, the second random access message may include a Msg4 in a four-step random access procedure or a MsgB in a two-step random access procedure.

Figure 13:
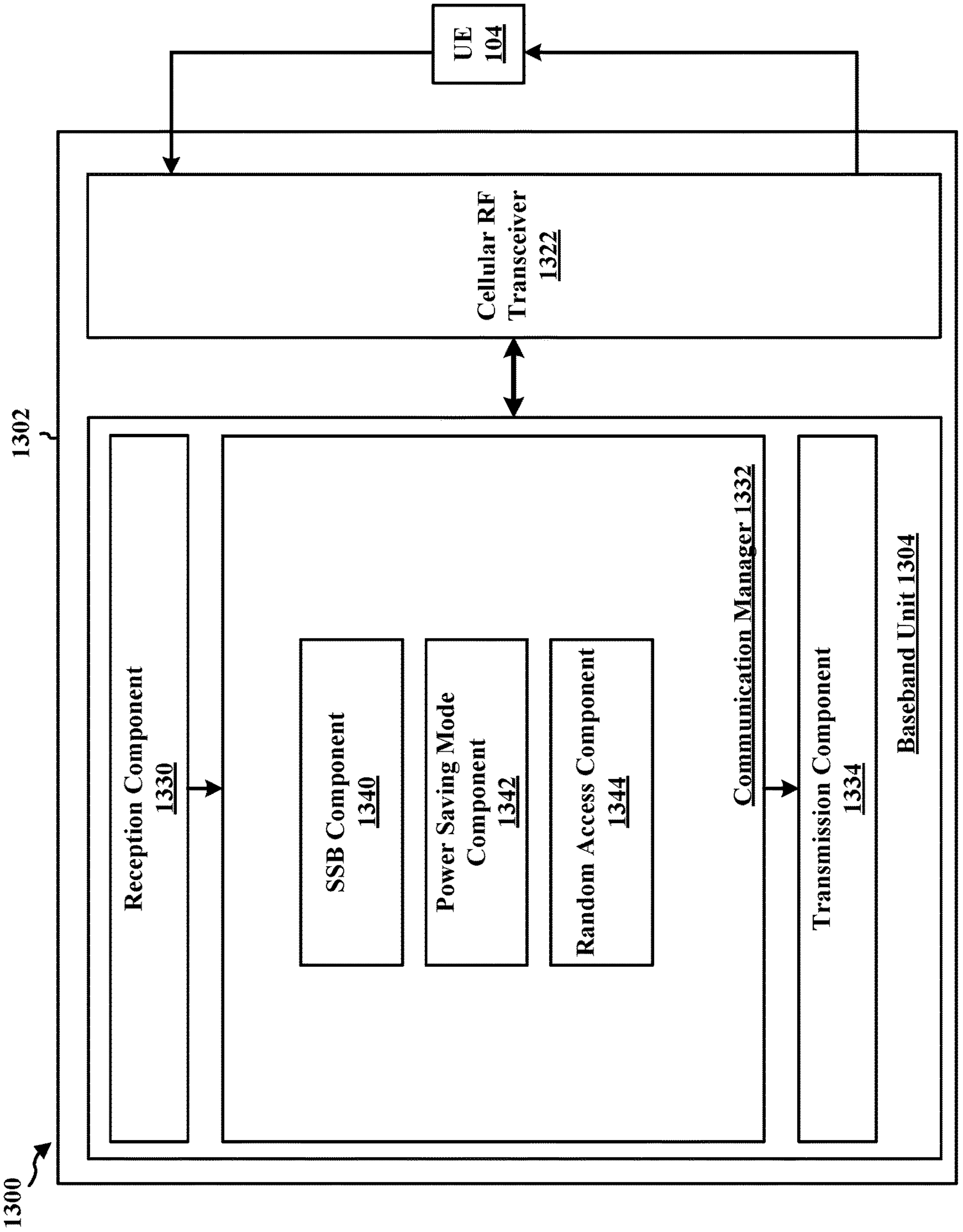
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 may be configured to perform the method of FIG. 12A and/or 12B. In some aspects, the apparatus 1302 may be a base station, a component of a base station, or may implement base station functionality. In some aspects, the apparatus 1302 may be a UE, a component of a UE, or may implement UE functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the first wireless device 310 and may include the memory 376 and/or at least one of the TX processor 316, the RX processor 370, and the controller/processor 375.

The communication manager 1332 includes an SSB component 1340 that is configured to output an SSB indicating that the power saving mode is active, e.g., as described in connection with 1204 in FIG. 12A. The communication manager 1332 further includes a power saving mode component 1342 that is configured to activate a power saving mode, e.g., as described in connection with 1202 in FIG. 12A. The communication manager 1332 further includes a random access component 1344 that is configured to obtain a first random access message; and output a second random access message indicating a power saving mode is active, e.g., as described in connection with 1206 and 1208 in FIG. 12B.

The apparatus may include additional components that perform each of the blocks of the algorithm in the flowcharts of FIGS. 12A and/or 12B. As such, each block in the flowcharts of FIGS. 12A and/or 12B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for activating a power saving mode; and means for outputting an SSB indicating that the power saving mode is active. In some aspects, the apparatus 1302 may include means for obtaining a first random access message; and means for outputting a second random access message indicating a power saving mode is active. The means may be one or more of the components of the apparatus 1302 configured to perform the functions recited by the means. As described supra, the apparatus 1302 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method for wireless communication at a receiver, comprising: receiving, from a transmitter, an SSB indicating a power saving mode is active; and communicating with the transmitter based on the power saving mode indicated by the SSB.

Aspect 2 is the method of aspect 1, further including that the power saving mode is one of multiple power saving modes.

Aspect 3 is the method of any of aspects 1 and 2, further including that at least one of a PSS sequence or an SSS sequence in the SSB indicates the power saving mode is active.

Aspect 4 is the method of any of aspects 1 to 3, further including that the power saving mode is one of multiple power saving modes, each of the multiple power saving modes being associated with a different seed for at least one of the PSS sequence or the SSS sequence.

Aspect 5 is the method of any of aspects 1 to 4, further including that at least one of a time domain resource or a frequency domain resource of the SSB indicates the power saving mode is active.

Aspect 6 is the method of any of aspects 1 to 5, further including that the power saving mode is one of multiple power saving modes, each of the multiple power saving modes being associated with one or more of a different time domain resource or a different frequency domain resource.

Aspect 7 is the method of any of aspects 1 to 6, further including that the SSB comprises a PBCH that indicates that the power saving mode is active.

Aspect 8 is the method of any of aspects 1 to 7, further including that the PBCH includes a field indicating an active power saving mode.

Aspect 9 is the method of any of aspects 1 to 8, further including that the PBCH further indicates a transition to a different power saving mode.

Aspect 10 is the method of any of aspects 1 to 9, further including that the receiver comprises a first UE, and the transmitter comprises a network node or a second UE, the first UE further comprising: at least one antenna.

Aspect 11 is an apparatus for wireless communication comprising at least one processor coupled to a memory and configured to implement any of aspects 1 to 10.

In aspect 12, the apparatus of aspect 11 further includes at least one antenna coupled to the at least one processor.

In aspect 13, the apparatus of aspect 11 or 12 further includes a transceiver coupled to the at least one processor.

Aspect 14 is an apparatus for wireless communication including means for implementing any of aspects 1 to 10.

In aspect 15, the apparatus of aspect 14 further includes at least one antenna coupled to the means to perform the method of any of aspects 1 to 10.

In aspect 16, the apparatus of aspect 14 or 15 further includes a transceiver coupled to the means to perform the method of any of aspects 1 to 10.

Aspect 17 is a non-transitory computer-readable storage medium storing computer executable code, where the code, when executed, causes a processor to implement any of aspects 1 to 10.

Aspect 18 is a method of wireless communication at a transmitter, comprising: activating a power saving mode; and outputting an SSB indicating that the power saving mode is active.

Aspect 19 is the method of aspect 18, further including that the power saving mode is one of multiple power saving modes.

Aspect 20 is the method of any of aspects 18 and 19, further including that at least one of a PSS sequence or an SSS sequence in the SSB indicates the power saving mode is active.

Aspect 21 is the method of any of aspects 18 to 20, further including that the power saving mode is one of multiple power saving modes, each of the multiple power saving modes being associated with a different seed for at least one of the PSS sequence or the SSS sequence.

Aspect 22 is the method of any of aspects 18 to 21, further including that at least one of a time domain resource or a frequency domain resource of the SSB indicates the power saving mode is active.

Aspect 23 is the method of any of aspects 18 to 22, further including that the power saving mode is one of multiple power saving modes, each of the multiple power saving modes being associated with one or more of a different time domain resource or a different frequency domain resource.

Aspect 24 is the method of any of aspects 18 to 23, further including that the SSB comprises a PBCH that indicates that the power saving mode is active.

Aspect 25 is the method of any of aspects 18 to 24, further including that the PBCH includes a field indicating an active power saving mode.

Aspect 26 is the method of any of aspects 18 to 25, further including that the PBCH further indicates a transition to a different power saving mode.

Aspect 27 is the method of any of aspects 18 to 26, further including that the transmitter comprises a network node or a UE, the transmitter further comprising: at least one antenna.

Aspect 28 is an apparatus for wireless communication comprising at least one processor coupled to a memory and configured to implement any of aspects 18 to 27.

In aspect 29, the apparatus of aspect 28 further includes at least one antenna coupled to the at least one processor.

In aspect 30, the apparatus of aspect 28 or 29 further includes a transceiver coupled to the at least one processor.

Aspect 31 is an apparatus for wireless communication including means for implementing any of aspects 18 to 27.

In aspect 32, the apparatus of aspect 31 further includes at least one antenna coupled to the means to perform the method of any of aspects 18 to 27.

In aspect 33, the apparatus of aspect 31 or 32 further includes a transceiver coupled to the means to perform the method of any of aspects 18 to 27.

Aspect 34 is a non-transitory computer-readable storage medium storing computer executable code, where the code, when executed, causes a processor to implement any of aspects 18 to 27.

Aspect 35 is a method of wireless communication at a receiver, comprising: transmitting a first random access message; receiving, from a transmitter, a second random access message indicating a power saving mode is active; and communicating with the transmitter based on the power saving mode indicated by the second random access message.

Aspect 36 is the method of aspect 35, further including that the second random access message indicates a set of multiple power saving modes including an active power saving mode, the set of multiple power saving modes including a shared power saving mode parameter.

Aspect 37 is the method of aspect 35, further including that the second random access message indicates a single power saving mode.

Aspect 38 is the method of any of aspects 35 to 37, further including that the second random access message comprises a Msg4 in a four-step random access procedure or a MsgB in a two-step random access procedure.

Aspect 39 is the method of any of aspects 35 to 38, further including that the receiver comprises a first UE, and the transmitter comprises a network node or a second UE, the first UE further comprising: at least one antenna.

Aspect 40 is an apparatus for wireless communication comprising at least one processor coupled to a memory and configured to implement any of aspects 35 to 39.

In aspect 41, the apparatus of aspect 40 further includes at least one antenna coupled to the at least one processor.

In aspect 42, the apparatus of aspect 40 or 41 further includes a transceiver coupled to the at least one processor.

Aspect 43 is an apparatus for wireless communication including means for implementing any of aspects 35 to 39.

In aspect 44, the apparatus of aspect 43 further includes at least one antenna coupled to the means to perform the method of any of aspects 35 to 39.

In aspect 45, the apparatus of aspect 43 or 44 further includes a transceiver coupled to the means to perform the method of any of aspects 35 to 39.

Aspect 46 is a non-transitory computer-readable storage medium storing computer executable code, where the code, when executed, causes a processor to implement any of aspects 35 to 39.

Aspect 47 is a method of wireless communication at a UE, comprising: obtaining a first random access message; and outputting a second random access message indicating a power saving mode is active.

Aspect 48 is the method of aspect 47, further including that the second random access message indicates a set of multiple power saving modes including an active power saving mode, the set of multiple power saving modes including a shared power saving mode parameter.

Aspect 49 is the method of aspect 47, further including that the second random access message indicates a single power saving mode.

Aspect 50 is the method of any of aspects 47 to 49, further including that the second random access message comprises a Msg4 in a four-step random access procedure or a MsgB in a two-step random access procedure.

Aspect 51 is the method of any of aspects 47 to 50, further including that the transmitter comprises a network node or a UE, the apparatus further comprising: at least one antenna.

Aspect 52 is an apparatus for wireless communication comprising at least one processor coupled to a memory and configured to implement any of aspects 47 to 51.

In aspect 53, the apparatus of aspect 52 further includes at least one antenna coupled to the at least one processor.

In aspect 54, the apparatus of aspect 52 or 53 further includes a transceiver coupled to the at least one processor.

Aspect 55 is an apparatus for wireless communication including means for implementing any of aspects 47 to 51.

In aspect 56, the apparatus of aspect 55 further includes at least one antenna coupled to the means to perform the method of any of aspects 47 to 51.

In aspect 57, the apparatus of aspect 55 or 56 further includes a transceiver coupled to the means to perform the method of any of aspects 47 to 51.

Aspect 58 is a non-transitory computer-readable storage medium storing computer executable code, where the code, when executed, causes a processor to implement any of aspects 47 to 51.

What is claimed is:

1. An apparatus for wireless communication at a receiver, comprising:

memory; and one or more processors coupled to the memory, the one or more processors configured to:

receive, from a transmitter, a synchronization signal block (SSB) that indicates a power saving mode of the transmitter is active, wherein the power saving mode is one of multiple power saving modes, and each of the multiple power saving modes is associated with a different seed for at least one of a primary synchronization signal (PSS) sequence or a secondary synchronization signal (SSS) sequence in the SSB; and communicate with the transmitter based on the power saving mode indicated by the SSB.

2. The apparatus of claim 1, wherein at least one of the PSS sequence or the SSS sequence in the SSB indicates the power saving mode is active.

3. The apparatus of claim 1, wherein the SSB further comprises a physical broadcast channel (PBCH) that indicates that the power saving mode is active.

4. The apparatus of claim 3, wherein the PBCH includes a field that indicates an active power saving mode.

5. The apparatus of claim 3, wherein the PBCH further indicates a transition to a different power saving mode.

6. The apparatus of claim 1, wherein the receiver comprises a first user equipment (UE), and the transmitter comprises a network node or a second UE, the apparatus further comprising:

at least one antenna.

7. The apparatus of claim 1, wherein the transmitter is a network entity, and the power saving mode is a network power saving mode.

8. The apparatus of claim 1, wherein the transmitter is a user equipment (UE).

9. An apparatus for wireless communication at a receiver, comprising:

memory; and one or more processors coupled to the memory, the one or more processors configured to:

receive, from a transmitter, a synchronization signal block (SSB) that indicates a power saving mode of the transmitter is active, wherein the power saving mode is one of multiple power saving modes, and each of the multiple power saving modes is associated with one or more of a different time domain resource or a different frequency domain resource of the SSB; and communicate with the transmitter based on the power saving mode indicated by the SSB.

10. The apparatus of claim 9, wherein at least one of a time domain resource or a frequency domain resource of the SSB indicates the power saving mode is active.

11. The apparatus of claim 9, wherein:

the transmitter is a network entity, and the power saving mode is a network power saving mode, or the transmitter is a user equipment (UE).

12. An apparatus for wireless communication at a transmitter, comprising:

memory; and one or more processors coupled to the memory, the one or more processors configured to:

activate a power saving mode of the transmitter; and output a synchronization signal block (SSB) that indicates the power saving mode of the transmitter is active, wherein the power saving mode is one of multiple power saving modes, and each of the multiple power saving modes is associated with a different seed for at least one of a primary synchronization signal (PSS) sequence or a secondary synchronization signal (SSS) sequence in the SSB.

13. The apparatus of claim 12, wherein at least one of the PSS sequence or the SSS sequence in the SSB indicates the power saving mode is active.

14. The apparatus of claim 12, wherein the SSB further comprises a physical broadcast channel (PBCH) that indicates that the power saving mode is active.

15. The apparatus of claim 14, wherein the PBCH includes a field that indicates an active power saving mode.

16. The apparatus of claim 14, wherein the PBCH further indicates a transition to a different power saving mode.

17. The apparatus of claim 12, wherein the transmitter comprises a network node or a user equipment (UE), the apparatus further comprising:

at least one antenna.

18. The apparatus of claim 12, wherein the transmitter is a network entity, and the power saving mode is a network power saving mode.

19. The apparatus of claim 12, wherein the transmitter is a user equipment (UE).

20. An apparatus for wireless communication at a transmitter, comprising:

memory; and one or more processors coupled to the memory, the one or more processors configured to:

activate a power saving mode of the transmitter; and output a synchronization signal block (SSB) that indicates the power saving mode of the transmitter is active, wherein the power saving mode is one of multiple power saving modes, and wherein each of the multiple power saving modes is associated with one or more of a different time domain resource or a different frequency domain resource of the SSB.

21. The apparatus of claim 20, wherein at least one of a time domain resource or a frequency domain resource of the SSB indicates the power saving mode is active.

22. The apparatus of claim 20, wherein:

the transmitter is a network entity, and the power saving mode is a network power saving mode, or the transmitter is a user equipment (UE).

23. An apparatus for wireless communication at a receiver, comprising:

memory; and one or more processors coupled to the memory, the one or more processors configured to:

transmit a first random access message that includes a preamble;

receive, from a transmitter, a second random access message that indicates a power saving mode of the transmitter is active, wherein the second random access message indicates a set of multiple power saving modes that includes an active power saving mode, and wherein the set of multiple power saving modes includes a shared power saving mode parameter; and communicate with the transmitter based on the power saving mode indicated by the second random access message.

24. The apparatus of claim 23, wherein the second random access message comprises a Msg4 in a four-step random access procedure or a MsgB in a two-step random access procedure.

25. The apparatus of claim 23, wherein the receiver comprises a first user equipment (UE), and the transmitter comprises a network node or a second UE, the apparatus further comprising:

at least one antenna.

26. The apparatus of claim 23, wherein the transmitter is a network entity, and the power saving mode is a network power saving mode.

27. The apparatus of claim 23, wherein the transmitter is a user equipment (UE).

28. An apparatus for wireless communication at a transmitter, comprising:

memory; and one or more processors coupled to the memory, the one or more processors configured to:

obtain a first random access message that includes a preamble; and output a second random access message that indicates a power saving mode of the transmitter is active, wherein the second random access message indicates a set of multiple power saving modes that includes an active power saving mode, and wherein the set of multiple power saving modes includes a shared power saving mode parameter.

29. The apparatus of claim 28, wherein the second random access message comprises a Msg4 in a four-step random access procedure or a MsgB in a two-step random access procedure.

30. The apparatus of claim 28, wherein the transmitter comprises a network node or a user equipment (UE), the apparatus further comprising:

at least one antenna.

31. The apparatus of claim 28, wherein the transmitter is a network entity, and the power saving mode is a network power saving mode.

32. The apparatus of claim 28, wherein the transmitter is a user equipment (UE).

33. A method for wireless communication at a receiver, comprising:

receiving, from a transmitter, a synchronization signal block (SSB) indicating a power saving mode of the transmitter is active, the power saving mode being one of multiple power saving modes, and each of the multiple power saving modes being associated with a different seed for at least one of a primary synchronization signal (PSS) sequence or a secondary synchronization signal (SSS) sequence in the SSB; and communicating with the transmitter based on the power saving mode indicated by the SSB.

34. A method for wireless communication at a receiver, comprising:

receiving, from a transmitter, a synchronization signal block (SSB) indicating a power saving mode of the transmitter is active, the power saving mode being one of multiple power saving modes, and each of the multiple power saving modes being associated with one or more of a different time domain resource or a different frequency domain resource of the SSB; and communicating with the transmitter based on the power saving mode indicated by the SSB.

35. A method for wireless communication at a transmitter, comprising:

activating a power saving mode of the transmitter; and outputting a synchronization signal block (SSB) indicating the power saving mode of the transmitter is active, the power saving mode being one of multiple power saving modes, and each of the multiple power saving modes being associated with a different seed for at least one of a primary synchronization signal (PSS) sequence or a secondary synchronization signal (SSS) sequence in the SSB.

36. A method for wireless communication at a transmitter, comprising:

activating a power saving mode of the transmitter; and outputting a synchronization signal block (SSB) indicating the power saving mode of the transmitter is active, the power saving mode being one of multiple power saving modes, and each of the multiple power saving modes being associated with one or more of a different time domain resource or a different frequency domain resource of the SSB.

37. A method for wireless communication at a receiver, comprising:

transmitting a first random access message including a preamble;

receiving, from a transmitter, a second random access message indicating a power saving mode of the transmitter is active, the second random access message further indicating a set of multiple power saving modes including an active power saving mode, the set of multiple power saving modes including a shared power saving mode parameter; and communicating with the transmitter based on the power saving mode indicated by the second random access message.

38. A method for wireless communication at a transmitter, comprising:

obtaining a first random access message including a preamble; and outputting a second random access message indicating a power saving mode of the transmitter is active, the second random access message indicating a set of multiple power saving modes including an active power saving mode, the set of multiple power saving modes including a shared power saving mode parameter.

* * * * *